United States Patent
Boldyrev et al.

(10) Patent No.: US 8,266,551 B2
(45) Date of Patent: Sep. 11, 2012

(54) METHOD AND APPARATUS FOR BINDING USER INTERFACE ELEMENTS AND GRANULAR REFLECTIVE PROCESSING

(75) Inventors: Sergey Boldyrev, Söderkulla (FI); Jukka Honkola, Espoo (FI); Mika Juhani Mannermaa, Burlington, MA (US); Hannu Laine, Espoo (FI); Ian Justin Oliver, Söderkulla (FI); Vesa-Veikko Luukkala, Espoo (FI); Sampo Juhani Sovio, Riihimäki (FI)

(73) Assignee: Nokia Corporation, Espoo (FI)

( * ) Notice: Subject to any disclaimer, the term of this patent is extended or adjusted under 35 U.S.C. 154(b) by 181 days.

(21) Appl. No.: 12/813,248

(22) Filed: Jun. 10, 2010

(65) Prior Publication Data

US 2011/0307841 A1  Dec. 15, 2011

(51) Int. Cl.
*G06F 3/033* (2006.01)
*G06F 3/00* (2006.01)

(52) U.S. Cl. ......... 715/863; 715/701; 715/702; 715/864

(58) Field of Classification Search .................. 715/863, 715/747, 748, 728; 345/158, 173
See application file for complete search history.

(56) References Cited

U.S. PATENT DOCUMENTS

| | | | | |
|---|---|---|---|---|
| 5,016,166 A | * | 5/1991 | Van Loo et al. | 718/104 |
| 5,127,098 A | * | 6/1992 | Rosenthal et al. | 711/202 |
| 6,545,669 B1 | * | 4/2003 | Kinawi et al. | 345/173 |
| 6,906,646 B1 | * | 6/2005 | Mills et al. | 341/101 |
| 7,363,342 B1 | * | 4/2008 | Wang et al. | 709/204 |
| 7,371,177 B2 | * | 5/2008 | Ellis et al. | 463/42 |
| 7,475,397 B1 | * | 1/2009 | Garthwaite et al. | 718/101 |
| 7,529,824 B2 | * | 5/2009 | Joseph | 709/223 |
| 7,532,196 B2 | * | 5/2009 | Hinckley | 345/156 |
| 7,533,189 B2 | * | 5/2009 | Mahajan et al. | 709/248 |
| 7,536,034 B2 | * | 5/2009 | Rhoads et al. | 382/107 |
| 7,636,794 B2 | * | 12/2009 | Ramos et al. | 709/248 |
| 7,703,073 B2 | * | 4/2010 | Illowsky et al. | 717/121 |

(Continued)

FOREIGN PATENT DOCUMENTS

GB  2 358 778 A  8/2001

(Continued)

OTHER PUBLICATIONS

U.S. Appl. No. 12/484,801, filed Jun. 15, 2009, Boldyrev et al.

(Continued)

*Primary Examiner* — Steven B Theriault
(74) *Attorney, Agent, or Firm* — Ditthavong Mori & Steiner, P.C.

(57) ABSTRACT

An approach is provided for binding user interface elements and granular reflective processing. An information management infrastructure determines to detect an event, from a first device, for specifying one or more user interface elements for transfer to a second device. The information management infrastructure further identifies one or more processes bound to the user interface elements. The information management infrastructure also determines at least one of a user context, an execution context within the user context, and one or more other execution contexts for the processes, wherein the one or more other execution contexts are from at least one of the user context and one or more other user contexts. The information management infrastructure further causes, at least in part, serialization of at least one of the user context, the execution context, and the one or more other execution contexts. The information management infrastructure further determines to transmit the serialization to the second device to initiate reconstruction of the at least one of the user context, the execution context, and the one or more other execution contexts.

20 Claims, 12 Drawing Sheets

U.S. PATENT DOCUMENTS

| | | | |
|---|---|---|---|
| 7,716,286 B2* | 5/2010 | Heins et al. | 709/204 |
| 7,761,885 B2* | 7/2010 | Labrou et al. | 719/330 |
| 7,817,991 B2* | 10/2010 | Hinckley et al. | 455/416 |
| 7,860,019 B2* | 12/2010 | Zhang et al. | 370/252 |
| 7,890,517 B2* | 2/2011 | Angelo et al. | 707/752 |
| 7,920,169 B2* | 4/2011 | Jung et al. | 348/211.1 |
| 7,958,453 B1* | 6/2011 | Taing | 715/744 |
| 7,991,896 B2* | 8/2011 | Shen et al. | 709/227 |
| 8,019,867 B1* | 9/2011 | Allen et al. | 709/224 |
| 8,078,646 B2* | 12/2011 | Das et al. | 707/802 |
| 2003/0126136 A1 | 7/2003 | Omoigui | |
| 2004/0054690 A1* | 3/2004 | Hillerbrand et al. | 707/104.1 |
| 2004/0203891 A1* | 10/2004 | Cole et al. | 455/456.1 |
| 2004/0230636 A1* | 11/2004 | Masuoka et al. | 708/800 |
| 2005/0030255 A1* | 2/2005 | Chiu et al. | 345/1.3 |
| 2005/0055330 A1* | 3/2005 | Britton et al. | 707/1 |
| 2005/0120096 A1 | 6/2005 | Rekimoto et al. | |
| 2005/0165795 A1* | 7/2005 | Myka et al. | 707/100 |
| 2005/0204141 A1* | 9/2005 | Sayers et al. | 713/181 |
| 2005/0204296 A1* | 9/2005 | Rossler et al. | 715/751 |
| 2005/0219211 A1* | 10/2005 | Kotzin et al. | 345/158 |
| 2005/0219223 A1* | 10/2005 | Kotzin et al. | 345/158 |
| 2005/0246726 A1* | 11/2005 | Labrou et al. | 719/328 |
| 2005/0254514 A1* | 11/2005 | Lynn | 370/450 |
| 2005/0289134 A1* | 12/2005 | Noguchi | 707/4 |
| 2005/0289558 A1* | 12/2005 | Illowsky et al. | 719/318 |
| 2006/0004834 A1* | 1/2006 | Pyhalammi et al. | 707/102 |
| 2006/0123011 A1* | 6/2006 | Stillion et al. | 707/10 |
| 2006/0123039 A1* | 6/2006 | Scheuerle et al. | 707/102 |
| 2006/0236302 A1* | 10/2006 | Bateman et al. | 717/104 |
| 2006/0236307 A1* | 10/2006 | Debruin et al. | 717/117 |
| 2007/0118394 A1* | 5/2007 | Cahoon | 705/1 |
| 2007/0124503 A1* | 5/2007 | Ramos et al. | 709/248 |
| 2007/0146347 A1* | 6/2007 | Rosenberg | 345/173 |
| 2007/0242061 A1* | 10/2007 | Rhoten et al. | 345/204 |
| 2008/0019569 A1* | 1/2008 | Rhoads et al. | 382/107 |
| 2008/0104032 A1* | 5/2008 | Sarkar | 707/3 |
| 2008/0120343 A1* | 5/2008 | Altrichter et al. | 707/104.1 |
| 2008/0215989 A1* | 9/2008 | Kravtsova et al. | 715/747 |
| 2008/0288913 A1* | 11/2008 | Creighton et al. | 717/100 |
| 2008/0294644 A1* | 11/2008 | Liu et al. | 707/10 |
| 2009/0031258 A1* | 1/2009 | Arrasvuori et al. | 715/863 |
| 2009/0119572 A1* | 5/2009 | Koivunen | 715/206 |
| 2009/0172101 A1* | 7/2009 | Arthursson | 709/205 |
| 2009/0172671 A1* | 7/2009 | Bobak et al. | 718/100 |
| 2009/0177777 A1* | 7/2009 | Behrendt et al. | 709/226 |
| 2009/0216714 A1* | 8/2009 | Gonzalez et al. | 707/3 |
| 2009/0265686 A1* | 10/2009 | Lucas et al. | 717/120 |
| 2009/0300493 A1* | 12/2009 | Hamilton et al. | 715/706 |
| 2009/0303676 A1 | 12/2009 | Behar et al. | |
| 2009/0313645 A1* | 12/2009 | Sathish et al. | 719/328 |
| 2010/0036862 A1* | 2/2010 | Das et al. | 707/101 |
| 2010/0054242 A1* | 3/2010 | Oliver et al. | 370/389 |
| 2010/0057815 A1* | 3/2010 | Spivack et al. | 707/794 |
| 2010/0070740 A1* | 3/2010 | Allen et al. | 712/30 |
| 2010/0138756 A1* | 6/2010 | Saund et al. | 715/758 |
| 2010/0156812 A1* | 6/2010 | Stallings et al. | 345/173 |
| 2010/0167646 A1* | 7/2010 | Alameh et al. | 455/41.2 |
| 2010/0198778 A1* | 8/2010 | Venugopal et al. | 707/602 |
| 2010/0241634 A1* | 9/2010 | Madhok | 707/748 |
| 2010/0257251 A1* | 10/2010 | Mooring et al. | 709/216 |
| 2010/0274804 A1* | 10/2010 | Muskal et al. | 707/769 |
| 2010/0281395 A1* | 11/2010 | Apted | 715/748 |
| 2010/0287513 A1* | 11/2010 | Singh et al. | 715/863 |
| 2010/0293106 A1* | 11/2010 | Rhoads et al. | 705/330 |
| 2010/0299436 A1* | 11/2010 | Khalid et al. | 709/226 |
| 2011/0019001 A1* | 1/2011 | Rhoads et al. | 348/158 |
| 2011/0083111 A1* | 4/2011 | Forutanpour et al. | 715/863 |
| 2011/0083130 A1* | 4/2011 | Boldyrev et al. | 718/1 |
| 2011/0088002 A1* | 4/2011 | Freer | 715/863 |
| 2011/0098056 A1* | 4/2011 | Rhoads et al. | 455/456.1 |
| 2011/0107227 A1* | 5/2011 | Rempell et al. | 715/738 |
| 2011/0113138 A1* | 5/2011 | Tyrkko et al. | 709/224 |
| 2011/0131299 A1* | 6/2011 | Sardary | 709/219 |
| 2011/0138381 A1* | 6/2011 | Hauser | 718/1 |
| 2011/0161076 A1* | 6/2011 | Davis et al. | 704/231 |
| 2011/0239114 A1* | 9/2011 | Falkenburg et al. | 715/702 |
| 2011/0244919 A1* | 10/2011 | Aller et al. | 455/556.1 |
| 2011/0258430 A1* | 10/2011 | Luukkala et al. | 713/150 |
| 2011/0289520 A1* | 11/2011 | Grigoriev et al. | 719/331 |
| 2011/0307857 A1* | 12/2011 | Lucas et al. | 717/104 |

FOREIGN PATENT DOCUMENTS

| | | |
|---|---|---|
| GB | 2 384 064 A | 7/2003 |

OTHER PUBLICATIONS

U.S. Appl. No. 12/571,575, filed Oct. 1, 2009, Boldyrev et al.

U.S. Appl. No. 12/797,284, filed Jun. 9, 2010, Oliver et al.

Accelerating Innovation in the Desktop, Crooke. Accessed: Jun. 28, 2010, http://download.intel.com/pressroom/kits/events/computex2009/Crooke_Computex_presentation.pdf, pp. 1-23.

ARM Community Topics. Accessed: Jun. 28, 2010, http://infocenter.arm.com/help/index.jsp?topic=/com.arm.doc.ddi0360f/index.html, pp. 1-1.

ARM11MPCORE Processor. Accessed: Jun. 28, 2010, http://www.arm.com/products/processors/classic/arm11/arm11-mpcore.php pp. 1-4.

Category Theory Lecture Notes. Turi, Laboratory for Foundations of Computer Science, Univeristy of Edinburgh, Sep. 1996 to Dec. 2001, pp. 1-61.

Cell Broadband Engine resource center. Accessed: Jun. 28, 2010, http://www.ibm.com/developerworks/power/cell/index.html, pp. 1-1.

Efficient Dispersal of Information for Security, Load Balancing, and Fault Tolerance, Rabin, Journal of the ACM, vol. 36(2), pp. 335-348, 1989, pp. 1-14.

Flexible Control of Downloaded Executable Content, Jaeger et al., ACM Transactions on Information and System Security, vol. 2, No. 2, May 1999, pp. 177-228.

Grand Central Dispatch, A better way to do multicore. Accessed: Jun. 28, 2010, http://images.apple.com/macosx/technology/docs/GrandCentral_TB_brief_20090903.pdf, pp. 1-6.

Grand Central Dispatch. Accessed: Jun. 28, 2010, http://developer.apple.com/technologies/mac/snowleopard/gcd.html, pp. 1-1.

Intel Hyper-Threading Technology. Accessed: Jun. 28, 2010, http://www.intel.com/technology/platform-technology/hyper-threading/index.htm, pp. 1-1.

K42. Accessed: Jun. 28, 2010, http://domino.research.ibm.com/comm/research_projects.nsf/pages/k42.index.html, pp. 1-6.

OpenCL—The open standard for parallel programming of heterogeneous systems. Accessed: Jun. 28, 2010, http://www.khronos.org/opencl/, pp. 1-6.

OpenMP, The OpenMP API specification for parallel programming. Accessed: Jun. 28, 2010, http://openmp.org/wp/openmp-specifications/, pp. 1-4.

Operating system concepts, IPC, RPC, 6th edition, Silberschat et al., John Wiley & Sons, pp. 108-125, 2002.

Personal Semantic Web Through a Space Based Computing Environment, Oliver, et al. Middleware for Semantic Web 08 at ICSC'08, Santa Clara, CA, USA 2008, pp. 1-14.

Process Migration, Milogicic et al., Dec. 5, 1998, pp. 1-24. Accessed: http://www.hpl.hp.com/techreports/1999/HPL-1999-21.pdf.

Process Migration, Milogicic et al., Dec. 5, 1998, pp. 25-48. Accessed: http://www.hpl.hp.com/techreports/1999/HPL-1999-21.pdf.

Process Migration, Milogicic et al., Feb. 1999, pp. 1-1. Accessed: http://www.hpl.hp.com/techreports/1999/HPL-1999-21.pdf.

Recovery Oriented Computing (ROC): Motivation, Definition, Techniques, and Case Studies, Patterson et al., Computer Science Technical Report UCB//CSD-02-1175, U.C. Berkeley, Mar. 15, 2002, pp. 1-16.Mar. 15, 2002, pp. 1-16.

Singularity. Accessed: Jun. 28, 2010, http://research.microsoft.com/en-us/projects/singularity/, pp. 1-3.

Singularity: Rethinking the Software Stack, Hunt et al. Accessed: Jun. 28, 2010, http://research.microsoft.com/pubs/69431/osr2007_rethinkingsoftwarestack.pdf, pp. 1-13.

The Berkeley/Standford Recovery-Oriented Computing (ROC) Project. Accessed: Jun. 28, 2010, http://roc.cs.berkeley.edu/, pp. 1-4.

The Design and Implementation of a First-Generation Cell Processor, Accessed: Jun. 28, 2010, https://www-01.ibm.com/chips/techlib/techlib.nsf/techdocs/7FB9EC5D5BBF51ED87256FC000742186/$file/ISSCC-10.2-Cell_Design.PDF, Pham et al., pp. 1-3.

The L4 u-Kernel Family. Accessed: Jun. 28, 2010, http://os.inf.tu-dresden.de/L4/bib.html, pp. 1-10.

The Pairing-Based Crypto Lounge, Accessed: May 18, 2010, http://www.larc.usp.br/~pbarreto/pblounge.html, pp. 1-31.

Tracking RDF Graph Provenance using RDF Molecules, Ding et al., pp. 1-2. Accessed on Aug. 17, 2010, 2010, http://aisl.umbc.edu/resources/219.pdf.

White Paper, Optimizing Hardware for x86 Server Virtualization, Bozman, Aug. 2009, http://www.intel.com/Assets/PDF/WhitePaper/IDCchoosingvirthardware.pdf, pp. 1-18.

Xen Architecture Overview, Feb. 13, 2008, v. 1.2, http://wiki.xensource.com/xenwiki/XenArchitecture?action=AttachFile&do=get&target=Xen+Architecture_Q1+2008.pdf, pp. 1-13.

Xen on Arm: System Virtualization using Xen Hypervisor for ARM-based Secure Mobile Phones, Hwang et al., Consumer Communications and Networking Conference, CCNC 2008, 5th IEEE pp. 57-261.

XenServer. Accessed: Jun. 28, 2010, http://www.citrix.com/English/ps2/products/product.asp?contentID=683148, pp. 1-1.

Bandelloni, R., et al. "Felxible Interface Migration" Jan. 13-16, 2004, Mandeira, Funchal, Portugal, pp. 1-10.

Demeure, A., et al. "The 4C Reference Model for Distributed User Interfaces" IEEE Computer Society, Copyright: 2008, pp. 1-10.

International Search Report for corresponding PCT Application No. PCT/FI2011/050493 dated Sep. 28, 2011, pp. 1-6.

Luyten, K., et al. "Distributed User Interface Elements to support Smart Interaction Spaces" Interdisciplinary Institute for BroadBand Technology, 2005, pp. 1-8.

Melchior, J., et al. "A Toolkit for Peer-to-Peer Distributed User Interfaces: Concepts, Implementation, and Applications" Jul. 15-17, 2009, pp. 1-10.

Written Opinion for corresponding PCT Application No. PCT/FI2011/050493 dated Sep. 28, 2011, pp. 1-8.

* cited by examiner

300

METHOD AND APPARATUS FOR BINDING USER INTERFACE ELEMENTS AND GRANULAR REFLECTIVE PROCESSING

BACKGROUND

Mobile devices with various methods of connectivity are now for many people becoming the primary gateway to the internet and also a major storage point for personal information. This is in addition to the normal range of personal computers and furthermore sensor devices plus internet based providers. Combining these devices together and lately the applications (e.g., including user interface elements of these applications) and the information stored by those applications is a major challenge of interoperability. This can be achieved through numerous, individual and personal information spaces in which persons, groups of persons, etc. can place, share, interact and manipulate webs of information with their own locally agreed semantics without necessarily conforming to an unobtainable, global whole. These information spaces, often referred to as smart spaces, are extensions of the 'Giant Global Graph' in which one can apply semantics and reasoning at a local level. More specifically, information spaces are working spaces embedded within distributed infrastructures that can span multiple computers, information appliances, sensors, and the like. In some instances, computing processes (e.g., granular reflective processes) associated with the information spaces may also be distributed over the infrastructures. Accordingly, service providers and device manufacturers face significant technical challenges in presenting a user interface that reflects the distributed nature of information spaces and associated processes.

SOME EXAMPLE EMBODIMENTS

Therefore, there is a need for an approach to providing binding of user interface elements and granular reflective processing to efficiently operate within distributed infrastructures.

According to one embodiment, a method comprises determining to detect an event, from a first device, for specifying one or more user interface elements for transfer to a second device. The method also comprises identifying one or more processes bound to the user interface elements. The method also comprises determining at least one of a user context, an execution context within the user context, and one or more other execution contexts for the processes, wherein the one or more other execution contexts are from at least one of the user context and one or more other user contexts. The method also comprises causing, at least in part, serialization of at least one of the user context, the execution context, and the one or more other execution contexts. The method further comprises determining to transmit the serialization to the second device to initiate reconstruction of the at least one of the user context, the execution context, and the one or more other execution contexts.

According to another embodiment, an apparatus comprising at least one processor, and at least one memory including computer program code for one or more programs, the at least one memory and the computer program code configured to, with the at least one processor, cause, at least in part, the apparatus to determine to detect an event, from a first device, for specifying one or more user interface elements for transfer to a second device. The apparatus is also caused to identify one or more processes bound to the user interface elements. The apparatus is also caused to determine at least one of a user context, an execution context within the user context, and one or more other execution contexts for the processes, wherein the one or more other execution contexts are from at least one of the user context and one or more other user contexts. The apparatus is also caused to cause, at least in part, serialization of at least one of the user context, the execution context, and the one or more other execution contexts. The apparatus is further caused to determine to transmit the serialization to the second device to initiate reconstruction of the at least one of the user context, the execution context, and the one or more other execution contexts.

According to another embodiment, a computer-readable storage medium carrying one or more sequences of one or more instructions which, when executed by one or more processors, cause, at least in part, an apparatus to determine to detect an event, from a first device, for specifying one or more user interface elements for transfer to a second device. The apparatus is also caused to identify one or more processes bound to the user interface elements. The apparatus is also caused to determine at least one of a user context, an execution context within the user context, and one or more other execution contexts for the processes, wherein the one or more other execution contexts are from at least one of the user context and one or more other user contexts. The apparatus is also caused to cause, at least in part, serialization of at least one of the user context, the execution context, and the one or more other execution contexts. The apparatus is further caused to determine to transmit the serialization to the second device to initiate reconstruction of the at least one of the user context, the execution context, and the one or more other execution contexts.

According to another embodiment, an apparatus comprises means for determining to detect an event, from a first device, for specifying one or more user interface elements for transfer to a second device. The apparatus also comprises means for identifying one or more processes bound to the user interface elements. The apparatus also comprises means for determining at least one of a user context, an execution context within the user context, and one or more other execution contexts for the processes, wherein the one or more other execution contexts are from at least one of the user context and one or more other user contexts. The apparatus also comprises means for causing, at least in part, serialization of at least one of the user context, the execution context, and the one or more other execution contexts. The apparatus further comprises means for determining to transmit the serialization to the second device to initiate reconstruction of the at least one of the user context, the execution context, and the one or more other execution contexts.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for binding user interface elements and granular reflective processing are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As used herein, the term "information space" or "smart space" refers to an aggregated information set from different sources. This multi-sourcing is very flexible since it accounts and relies on the observation that the same piece of information can come from different sources. For example, the same information (e.g., contact information for a particular contact) can appear in the same information space from multiple sources (e.g., a locally stored contacts database, a public directory, a work contact database, etc.). In one embodiment, information within the information space or smart space is represented using Semantic Web standards such as Resource Description Framework (RDF), RDF Schema (RDFS), OWL (Web Ontology Language), FOAF (Friend of a Friend ontology), rule sets in RuleML (Rule Markup Language), etc. Furthermore, as used herein, RDF refers to a family of World Wide Web Consortium (W3C) specifications originally designed as a metadata data model. It has come to be used as a general method for conceptual description or modeling of information that is implemented in web resources; using a variety of syntax formats. Although various embodiments are described with respect to information spaces and RDF, it is contemplated that the approach described herein may be used with other structures and conceptual description methods used to create models of information.

Figure 1:
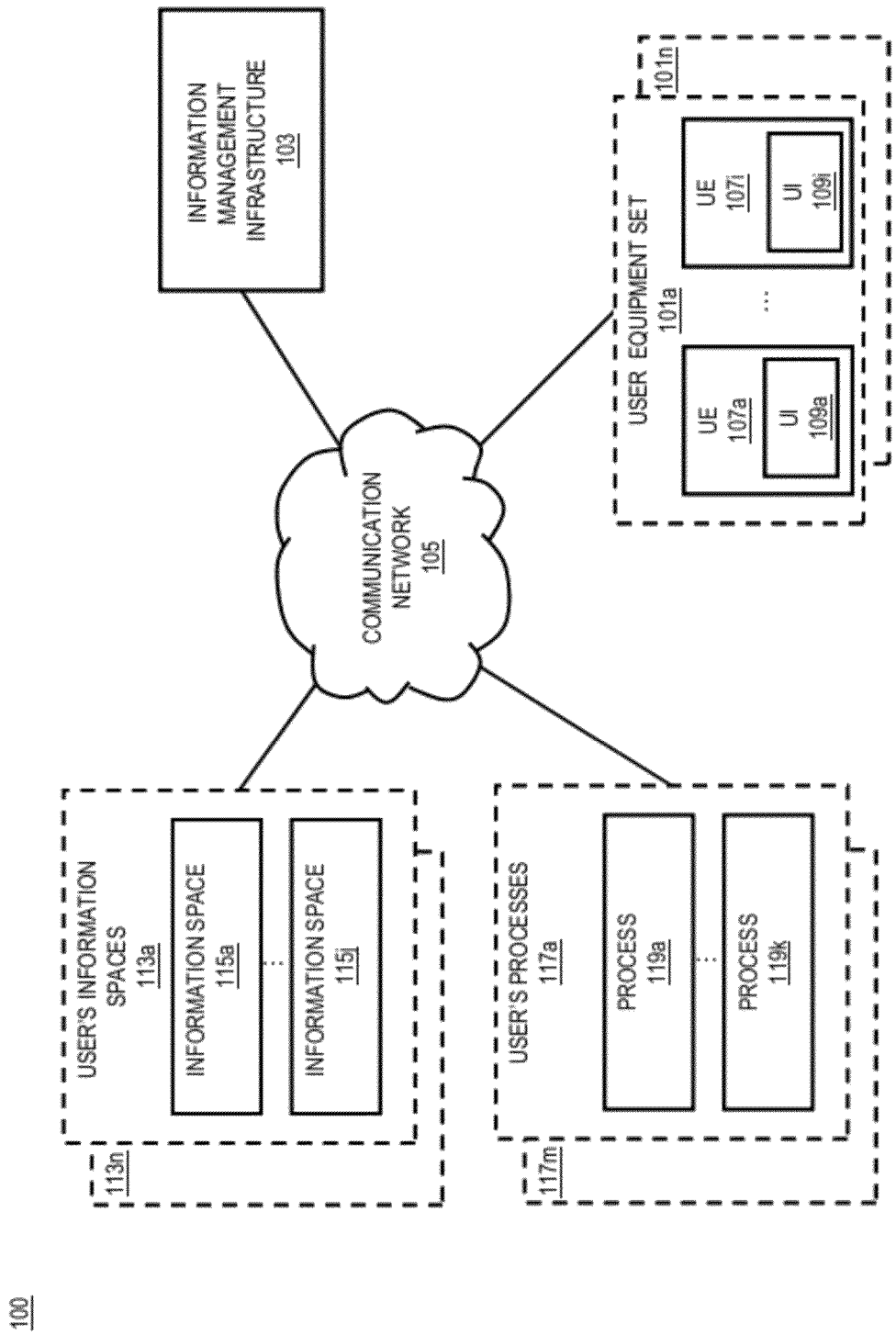
FIG. 1 is a diagram of a system capable of binding user interface elements and granular reflective processing, according to one embodiment.

FIG. 1 is a diagram of a system capable of binding user interface elements and granular reflective processing, according to one embodiment. As previously described, an information space consists of, for instance, several distributed devices that communicate information (e.g. RDF graphs) via a shared memory such as a Semantic Information Broker (SIB). In one embodiment, a device within an information space environment may store information locally in its own memory space or publish information to the semantic information broker. In the first case, the device is responsible for any process needed for combination or extraction of information, while in the second case the data manipulation processes can be conducted by the semantic information broker. By way of example, the information stored within an information space may be organized as lists or sets of information that can include many data elements (e.g., a contact list, inventory of goods, business directory, etc.).

The basic concept of information space technology includes providing access to distributed information for various devices within the scope of the information space. In certain embodiments, this access is provided in such a way that the distributed nature of the information is hidden from users. As a result, the information space appears to a user as if all the accessed information is stored on the same device. The information space also enables a user to have control over information distribution by transferring information between devices that the user has access to. For example, a user may want to transfer information among work devices, home devices, and portable devices. Current technologies enable a user of a mobile device to manipulate contexts such as data and information via the elements of a user interface of their user equipment. However, a user generally does not have control over the distribution of computations and processes associated with the information in the information. In other words, an information space does not provide a user or an owner of a collection of information distributed over the information space with the ability to control distribution of underlying computational processes (e.g., applications that manipulate the information in the information space). Moreover, the user or owner typically cannot decide or direct which related process is to be executed by which device or component of the information space.

To address this problem, a system 100 of FIG. 1 introduces the capability of binding user interface elements to granular reflective processes to enable a user to distribute and reconstruct one or more of the processes to one or more other devices. As used herein, the term granular refers to how finely a particular computing process is subdivided (e.g., a minimum unit of code that can be used to perform a task or function of the process). By way of example, granularity (e.g., a minimum level of granularity, different levels of granularity, etc.) of the processes can be defined by the developer of the process or can be dynamically determined by the system 100. In addition, as used herein, the term reflective or reflectivity refers to a characteristic of a computer process whereby the structure or behavior of the process can be dynamically modified, for instance, during the execution of the process itself. In other words, reflectivity enables the process to make changes to its instructions (e.g., by dividing the instructions based on a specified level of granularity) as needed or as directed during execution of the process.

In one embodiment, the mechanism of system 100 provides reflective user interface elements rendering on top of a granular and reflective process migration infrastructure. This process migration infrastructure, for instance, enables all or a portion a process to be distributed, reconstructed, and/or executed between one or more devices. In this way, the resource burden associated with executing all or a portion of the processes can be distributed to other devices or components of the system 100 (e.g., servers, cloud-computing, peer devices, etc.) to advantageously reduce the burden on any one device. Furthermore, the mechanism provides the user with a visual user interface whereby the user can manipulate one or more user interface elements that are bound to one or more granular reflective processes. The manipulation, in turn, causes distribution of the processes among one or devices. For example, a user interface element depicting a search request (e.g., a query input field) can be pushed, flicked, or otherwise directed to the other device. The other device can then reconstruct the search process associated with the search user interface element for execution.

As shown in FIG. 1, the system 100 comprises a set of user equipment (UE) sets 101a-101n for each user consisting of UEs 107a-107i, each having connectivity to an information management infrastructure 103 via a communication network 105. The UE sets 101a-101n, for instance, represent the group of UEs 101a-107i that are organized for sharing or distribution of granular reflective processes using the approach as described herein. It is contemplated that the sets 101a-101n may be predetermined or created dynamically as the granular reflective processes are distributed via corresponding user interface elements. In certain embodiments, the UEs 107a-107i need not be organized as sets 101a-110n, and may implement the approach described herein on an ad hoc device-to-device basis.

By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UEs 107a-107i is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, Personal Digital Assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 107a-107i can support any type of interface to the user (such as "wearable" circuitry, etc.).

In one embodiment, the UEs 107a-107i are respectively equipped with one or more user interfaces (UI) 109a-109i. Each UI 109a-109i may consist of several UI elements (not shown) at any time, depending on the service that is being used. UI elements may be icons representing user contexts such as information (e.g., music information, contact information, video information, etc.), functions (e.g., setup, search, etc.) and/or processes (e.g., download, play, edit, save, etc.). Additionally, each UI element may be bound to a context/process by granular migration. In one embodiment, granular migration enables processes to be implicitly or explicitly migrated between devices, information spaces, and other infrastructure. The process migration can be initiated for example by means of single-cast (e.g., to just another UE 107) or multicast (e.g., to multiple other UEs 107). Additionally, process migration may be triggered via gesture recognition, wherein the user preselects a particular set of UI elements and makes a gesture to simulate "pouring" the selected UE elements from one device to another. It is contemplated that any other gesture (e.g., a sliding gesture, movement towards another UE 107, spinning, rotating, etc.) may be used to indicate a request to migrate a process from one UE 107 to another UE 107, another component of the network 105, or the like.

In one embodiment, a UI element may be a region of the UI which is defined by the user as a free-shape contour using fingers or a pointing device. In another embodiment, gesture recognition may be used when user grabs a preselected set of UI elements or a predefined region of the UI and moves it from one device to another or from one logical representation to another.

As seen in FIG. 1, a user of UEs 107a-107i may own various pieces of information distributed over a set 113a of information spaces 115a-115j. The user can access the information via the set of equipment 101a consisting of UEs 107a-107i wherein each UE 107a-107i is equipped with one or more user interfaces (UI) 109a-109i. Furthermore, each UE 107a-107i may have access to a set 117a of processes 119a-119k that can be used to manipulate the information stored in information spaces 115a-115j and produce results requested by the user of the UE.

In one embodiment, the information management infrastructure 103 consists of information about binding between the elements of each UI 109a-109i, areas of rendered UIs 109a-109i and actual information processing through processes 119a-119k. The binding information enables a user of a UE 107a-107i to; for example, visually assign particular tasks to other UEs owned by the same user. For example, the user may select the tasks that need to be completed, by touching the UI elements related to those tasks on a UI of a first UE, pointing the UE towards other on-premises entities (other UEs in the vicinity of the first UE), distribute the actual computation for the selected tasks to other UEs by kicking out, brushing off or pouring the particular UI elements from the first UE to other UEs through figure gestures.

In one embodiment, binding between the elements or regions of UIs 109a-109i and the actual computations or functions performed by processes 119a-119k is done through computation closures defined and stored by the information management infrastructure 103. As used herein, computation closures identify relations and communications among various processes including passing arguments, sharing process results, flow of data and process results, etc. The computation closures (e.g., a granular reflective set of instructions, data, and/or related execution context or state) provide the capability of slicing of computations for processes 119a-119k for a user and transmitting the computation slices between UEs 107a-107i, infrastructures 103 and information spaces 115a-115j.

The information management infrastructure 103 may use seamless information processing techniques in order to enhance the computation closures. Seamless information management is the enabling technology for reflective process or context migration. In one embodiment, in addition to the migration of computations between devices, virtual execution environments such as M3® may be dynamically bound. The application of seamless information processing techniques may allow dynamically balanced load between concurrent execution environments taking into account the user's current context.

By way of example, the UEs of sets 101a-101n, the information management infrastructure 103, and the information space sets 113a-113n communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

Figure 2:
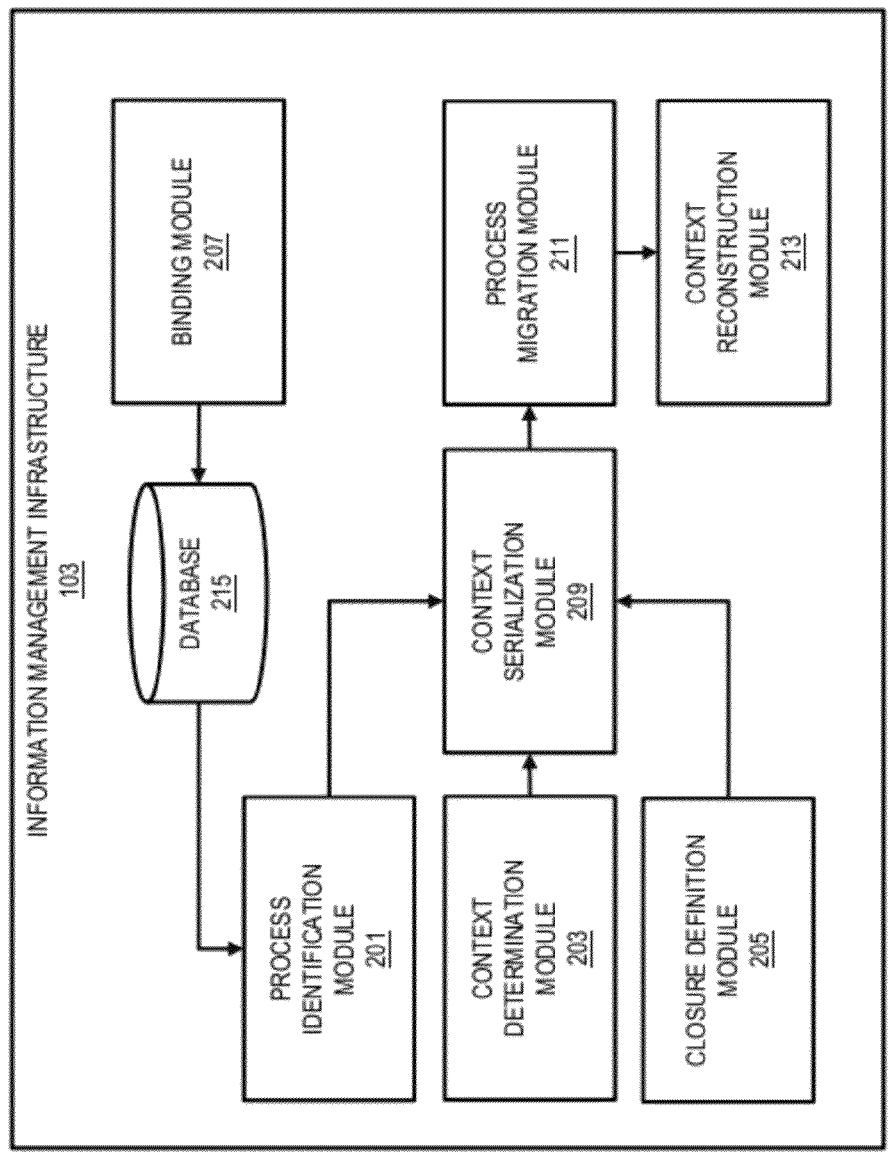
FIG. 2 is a diagram of the components of information management infrastructure, according to one embodiment.

FIG. 2 is a diagram of the components of information management infrastructure, according to one embodiment. By way of example, the information management infrastructure includes one or more components for providing binding of user interface elements and granular reflective processing. It is contemplated that the functions of these components may be combined in one or more components or performed by other components of equivalent functionality. In this embodiment, the information management infrastructure includes a process determination module 201, a context determination module 203, a closure definition module 205, a binding module 207, a context serialization module 209, a process migration module 211, a context reconstruction module 213 and a database 215.

The information management infrastructure 103 receives an input entered by a user of a first UE 107a via, for example, selecting certain elements of a UI 109a presented at the UE 107a by touching the elements with finger, a pointing tool (e.g., a pen), etc., and kicking or pouring the selected elements towards a second UE 107b. The user of the first UE 107a may use various gestures for showing their intention to transfer processes to another UE 107b. The gesture may include a flicking motion, a pouring motion, a grabbing motion, a pointing motion, a free-form motion to define at least a portion of the UI elements, or a combination thereof.

The process identification module 201 analyses the received input and determines the processes that are bound to the UI elements identified in the input. The information management infrastructure 103 may contain a predefined library of binding relations between various UI elements with lists of processes. The binding library may be assembled by software developers throughout the development phase for each UE type using the binding module 207 and stored in the database 215. Once the processes bound to the selected UI components are identified, the context determination module 203 determines a context including a user context (e.g., the state of the first UE 107a and UI 109a), an execution context (e.g., the memory states, processors states, and related information of device when executing a particular application or service) or a combination thereof for the identified processes. The determined context would be used during the reconstruction process at the second UE 107b.

In one embodiment, the closure definition module 205, determines computation closures (e.g., a granular reflective set of instructions, data, and/or related execution context or state) for processes related to the selected UI elements and stores the closures in the database 215. The stored closures may be used for slicing computations into smaller independent processes to be executed by various available UEs 107a-107i, using the data which may be stored on the distributed information spaces 115a-115j.

In another embodiment, the context serialization module 209 utilizes the identified processes by process identification module 201, determined context by the context determination module 203 and defined closures by closure definition module 205 and produces the serialized granular computation elements.

In one embodiment, the context serialization may be generated and stored using Resource Description Framework (RDF) format. RDF is a family of World Wide Web Consortium (W3C) specifications originally designed as a metadata data model. It has come to be used as a general method for conceptual description or modeling of information that is implemented in web resources; using a variety of syntax formats. The underlying structure of any expression in RDF is a collection of triples, each consisting of three disjoint sets of nodes including a subject, a predicate and an object. A subject is an RDF URI reference (U) or a Blank Node (B), a predicate is an RDF URI reference (U), and an object is an RDF URI reference (U), a literal (L) or a Blank Node (B). A set of such triples is called an RDF graph. Table 1 shows an example RDF graph structure.

TABLE 1

| Subject | Predicate | Object |
| --- | --- | --- |
| uri://....../rule#CD-introduction, | rdf:type, | uri://............/Rule |
| uri://....../rule#CD-introduction, | uri://....../rule#assumption, | "c" |

It is noted that the UI element or UI regions selected by the user can be granularly fractioned. The granularity may be achieved by the basic format of operation (e.g. RDF) within the specific computing environment. Furthermore, the reflectivity of processes (i.e. the capability of processes to provide a representation of their own behavior to be used for inspection and/or adaptation) may be achieved by encoding the behavior of the computation in RDF format. Additionally, the context may be assumed to be partly predetermined and stored as RDF in the information space and partly be extracted from the execution environment. It is noted that the RDF structures can be seen as subgraphs, RDF molecules (i.e., the building block of RDF graphs) or named graphs in the semantic information broker (SIB) of information spaces.

In one embodiment, the process migration module 211 identifies the targeted virtual run-time environment (i.e. the processing agents) where the processes can be migrated to. Prior to migration of the processes, the process migration module 211 needs to ensure that the targeted environment has proper access to the information required by the processes. The process migration module 211 may query the agents within the targeted environment about their access capabilities (e.g., access rights, permissions, connectivity, etc.). By way of example, access capabilities may also specify what specific information, context, computing closures, processes, etc. accessible by targeted environment. The process migration module 211 may then check whether the information accessible by an agent of the target environment is consistent (e.g., compatible formats, correct versions, compatible runtime environments, etc.) with the information required by the processes and also whether the resource load in the target environment allows the agents in the environment to accept execution of migrated processes. If the consistency condition is met and the target environment has sufficient available resources, the process migration module 211 transfers the processes to the target environment. Otherwise, a warning may be issued to the user of the first UE 107a stating that the selected second UE 107b is unable to perform the requested tasks or processes. The transmission of processes may be a direct transmission or an indirect transmission via an information space 115a-115j, a third device, a cloud-computing component, a network infrastructure element, or a combination thereof.

Following the migration of processes to the target environment on the second UE 107b, the content reconstruction module 213 reconstructs the migrated processes by simulating the context as stored in the database 215. By way of example, this simulation may include emulating any necessary runtime environments for executing the transferred processes. In addition or alternatively, the reconstruction of the user context, execution context or the combination thereof may be performed by a third device. In this way, one or more devices (e.g., the second UE 101b and the third UE 101c) can reconstruct all or a portion of the processes of the first UE 101a for execution individually or cooperatively in parallel.

It is noted that all the information that is exchanged among the components of the information management infrastructure 103 including the granularity, the reflectivity, the context, the targeted environment, the information accessible by agents, etc., may be encoded (e.g., serialized) and stored in RDF format so that the pieces of information are compatible and, therefore, combining and extracting of information can be performed with less complexity.

Figure 3:
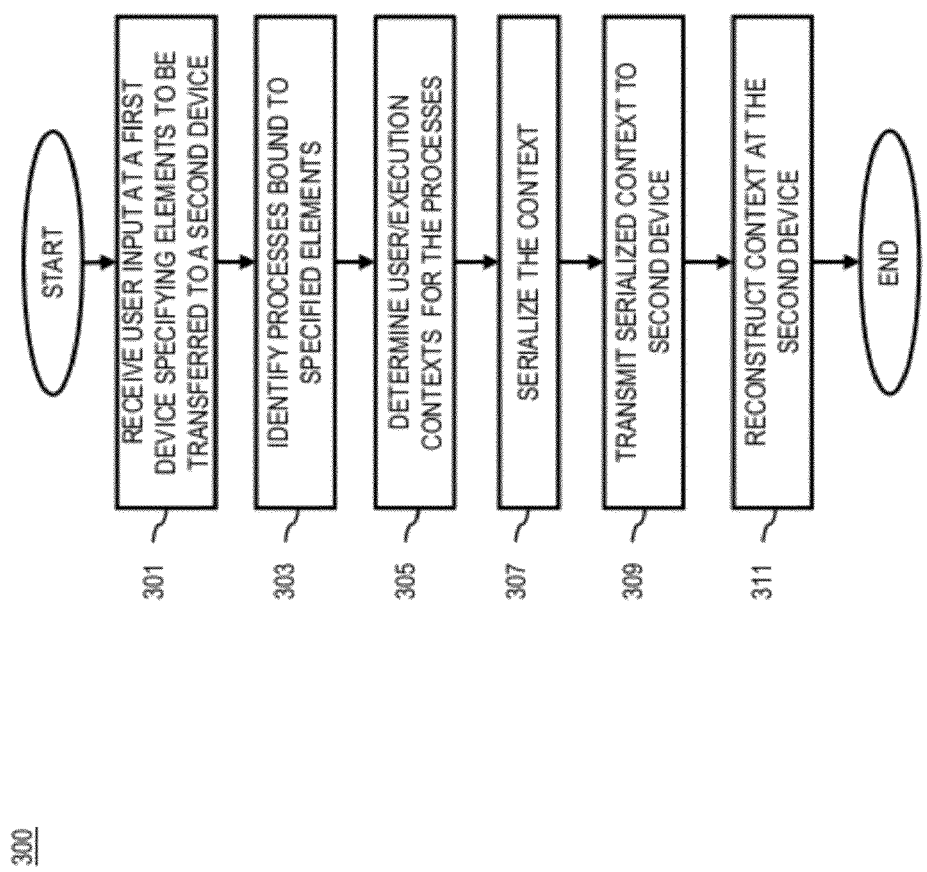
FIG. 3 is a flowchart of a process for binding user interface elements and granular reflective processing, according to one embodiment.
Figure 10:
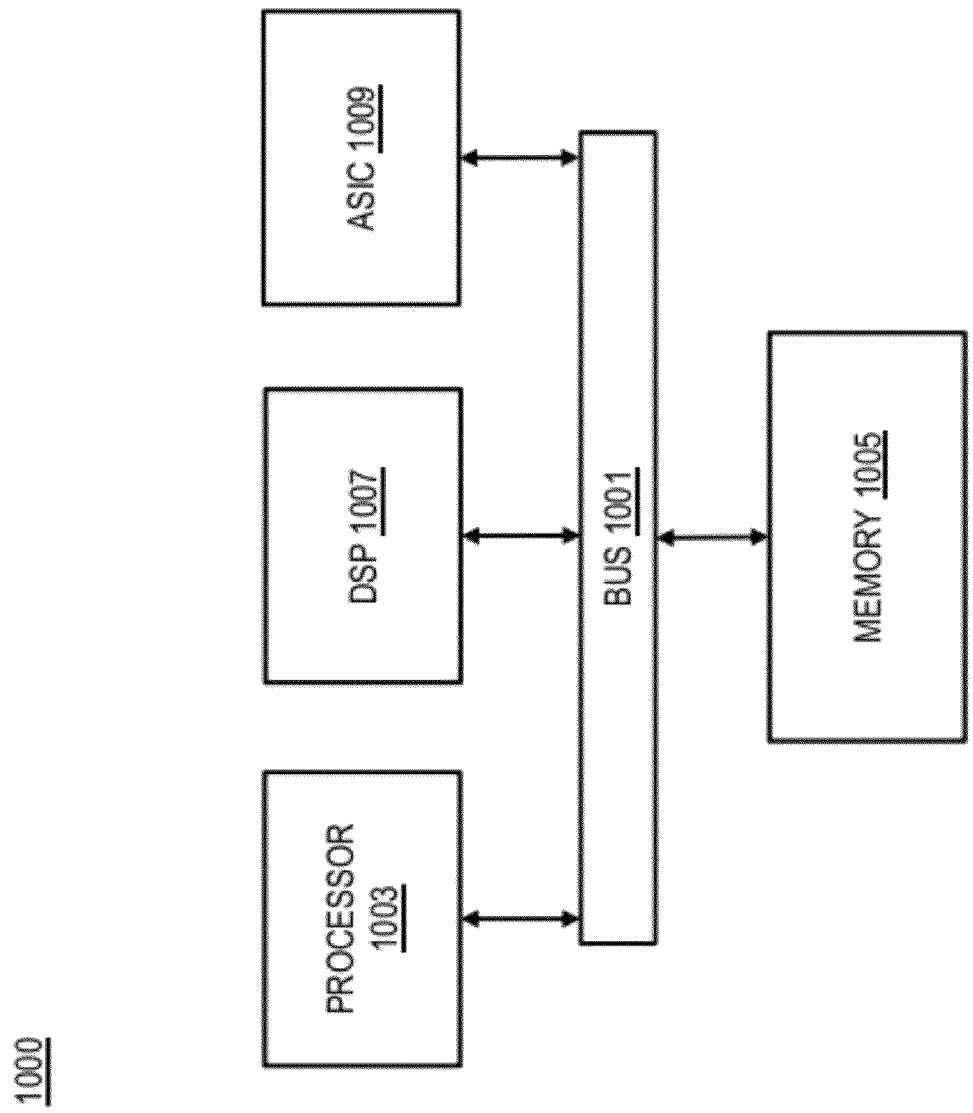
FIG. 10 is a diagram of a chip set that can be used to implement an embodiment of the invention.

FIG. 3 is a flowchart of a process for binding user interface elements and granular reflective processing, according to one embodiment. In one embodiment, the information management infrastructure 103 performs the process 300 and is implemented in, for instance, a chip set including a processor and a memory as shown in FIG. 10. In step 301, the information management infrastructure 103 receives user input from a first UE 107a-107i. The user input may be a gesture such as a flicking motion, a pouring motion, a grabbing motion, a pointing motion, a free-form motion to define at least a portion of UI elements, or a combination thereof. The gesture may also identify a second UE 107a-107i that the user would like to transmit the processes related to the selected UI elements to, for example by motioning towards a second UE located in the proximity of the first UE 107a-107i.

Per step 303, information management infrastructure 103 identifies the processes that are bound to the selected UI elements. The binding may have been originally identified by the designers of the UE 107a-107i at the manufacturing or application development stage. In certain embodiments, the binding information may be stored in the database 215 by the binding module 207 of the information management infrastructure 103. The process identification module 201 may access the binding information in the database 215 and extract the processes bound to UI elements from there. Table 2 shows an example entry in the binding table. The example of Table 2 shows a UI element for online search. The processes involved in the search may include, connecting to the internet, opening the website for the search engine and inserting the keyword for the search.

In one sample use case, a user of a UE 107a-107i may start a search process on one UE (e.g. a mobile phone) and wish to transfer the search to another UE (e.g. a laptop computer) while they may use the first UE for another process (e.g. making a phone call). The user may grab the search engine icon on the UI of the first UE and push it towards the second UE. The user gesture as an input triggers the migration process. For the search to start on a second UE the processes bound to the UE element (search engine icon) need to be identified. The process identification module 201 accesses table 2 from the database 215 and retrieve the list of bound processes. Per step 305 the context determination module 203 verifies the current state of the first UE, the second UE and the state of search engine process on the first UE (the first UE may have already started the search process). The context determination module 203 stores the retrieved states in database 215.

TABLE 2

| UI Element | Bound Processes |
| --- | --- |
| Online Search | Connect to the internet, open the search engine, insert the search keyword, . . . |

In step 307 the context serialization module 209 generates the RDF graphs related to the processes that need to be migrated from the first UE to the second UE. The context serialization module 209 may use the information produced by process identification module 201, and the context determination module 203. The context serialization module may also extract information from database 215 including the computation closure information produced by the closure definition module 205 and stored in the database 215. The generated RDF graphs may be stored in database 215, in the local memory of the first UE or in any storage available throughout the information spaces 113a-113n that are accessible to the first and the second UEs.

In step 309, the process migration module 211 transmits the stored RDF graphs for the migrating processes to the second UE. In one embodiment, a link to the location in the information space where the RDF graphs are stored may be transmitted to the second UE. The second UE can use the link to access the RDF graphs. Prior to transmission of the process information to the second UE the process migration module 211 checks whether the second UE has access to the resources that are required for executing the migrated processes. For example, if the second UE is unable to connect to the internet, the process migration cannot be completed.

In one embodiment, the process migration module 211 may check the capabilities of the targeted environment for executing the migrated processes, such as proper access to the resources required by the processes, before the context serialization module 209 generates the RDF graphs for the migrating processes. In this case, if the targeted environment is not qualified for hosting the migration, the context serialization may not be needed. The process migration module 211 may send an alert to the first UE to inform the user that the migration to their selected device has failed. The user may then try migrating processes to a third available UE.

If the second UE has sufficient capabilities and resource access to execute the migrating processes, per step 311 the context reconstruction module 213 reconstructs the state of the processes of the first UE on the second UE using the serialized RDF graphs. Following the completion of context reconstruction, the second UE can resume the processes from the point that they were left off on the first UE.

Figure 4:
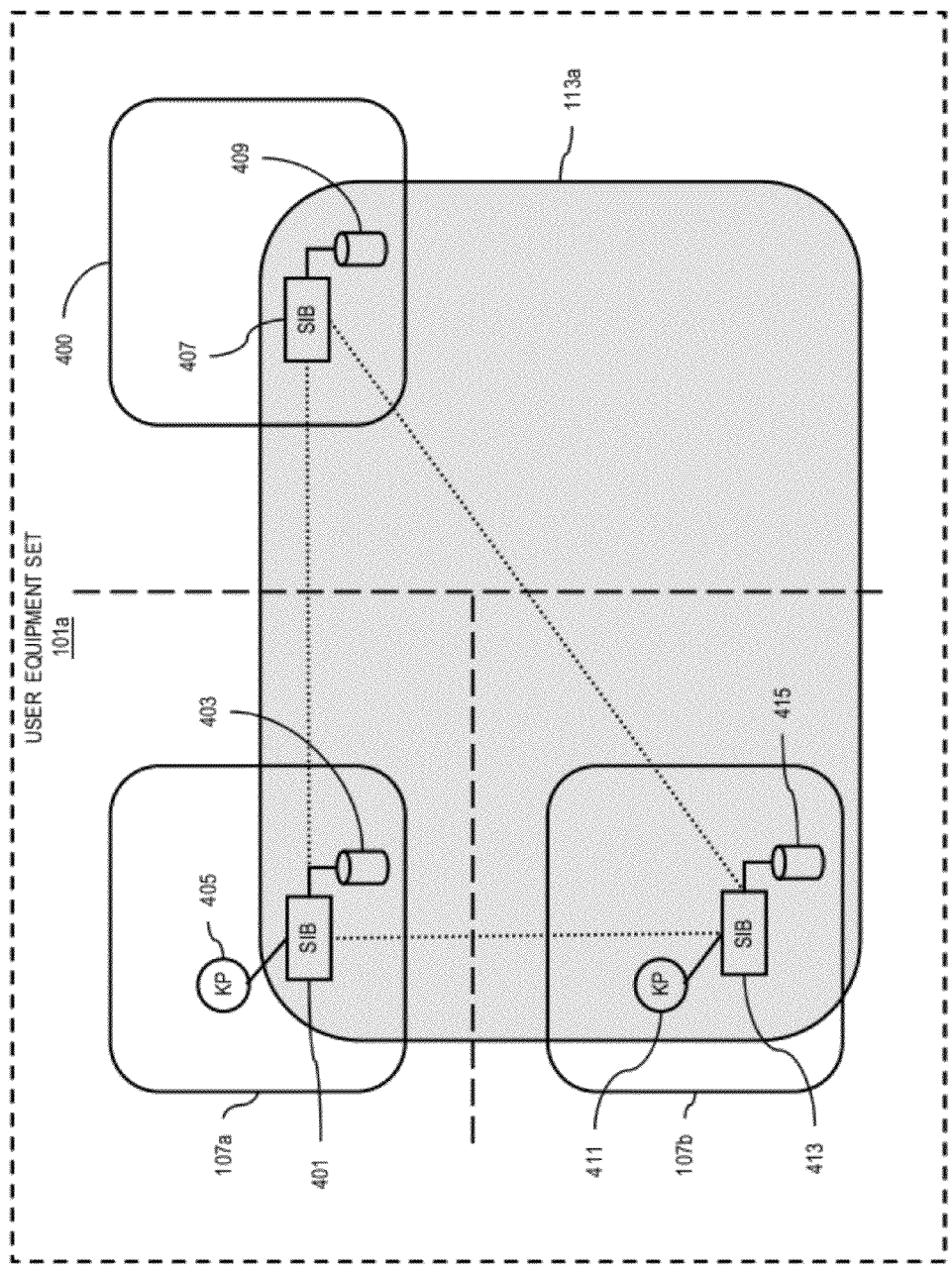
FIG. 4 is a diagram of user equipment set, according to one embodiment.

FIG. 4 is a diagram of user equipment set, according to one embodiment. As seen in FIG. 4 the user equipment set 101a consists of UEs 107a and 107b and another device 400 which may not be a user equipment, but a part of the information space 113a for the user. The device 400 may for example be part of a server environment. The user may own an information space set 113a which is distributed between devices 107a, 107b and 400. The information space set 113a includes Semantic Information Brokers (SIB) 401 in UE 107a, the SIB 407 in device 400 and the SIB 413 in UE 107b. Additionally, each information space in set 113a has knowledge processors (KPs) 405 in UE 107a and 411 in UE 107b. Furthermore, the information space may utilize storage components 403, 409 and 415 of the devices involved in the information space. The SIBs of information space set 113a may communicate with each other (shown with dotted lines). Assuming that UEs 107a and 107b are located in a close proximity from each other (e.g. in an office) the user may desire to transmit processes that were initiated on one of the UEs to the other. For example, the user may start playing an online video on UE 107a, and realizing that the UE 107a does not have sufficient processing power or storage space for downloading and playing the video. The user may grab the element on the UI of the UE 107a representing the video and push it towards UE 107b. The user gesture may activate the migration process from UE 107a to UE 107b by the information management infrastructure 103 and as a result the video is downloaded and played on UE 107b, while user is able to utilize UE 107a for other purposes (e.g. making phone calls, text messaging, etc.). The execution of migrated processes is performed by KP 411 under the supervision of the information management infrastructure 103. Following the completion of the execution, the information management infrastructure 103 may update the context of UE 107a to the state as if the video was played by UE 107a. Furthermore, the context of UE 107b may be reset to the state prior to process migration, meaning that processes that may have been halted for the execution of the migrated processes can be resumed.

Figure 5:
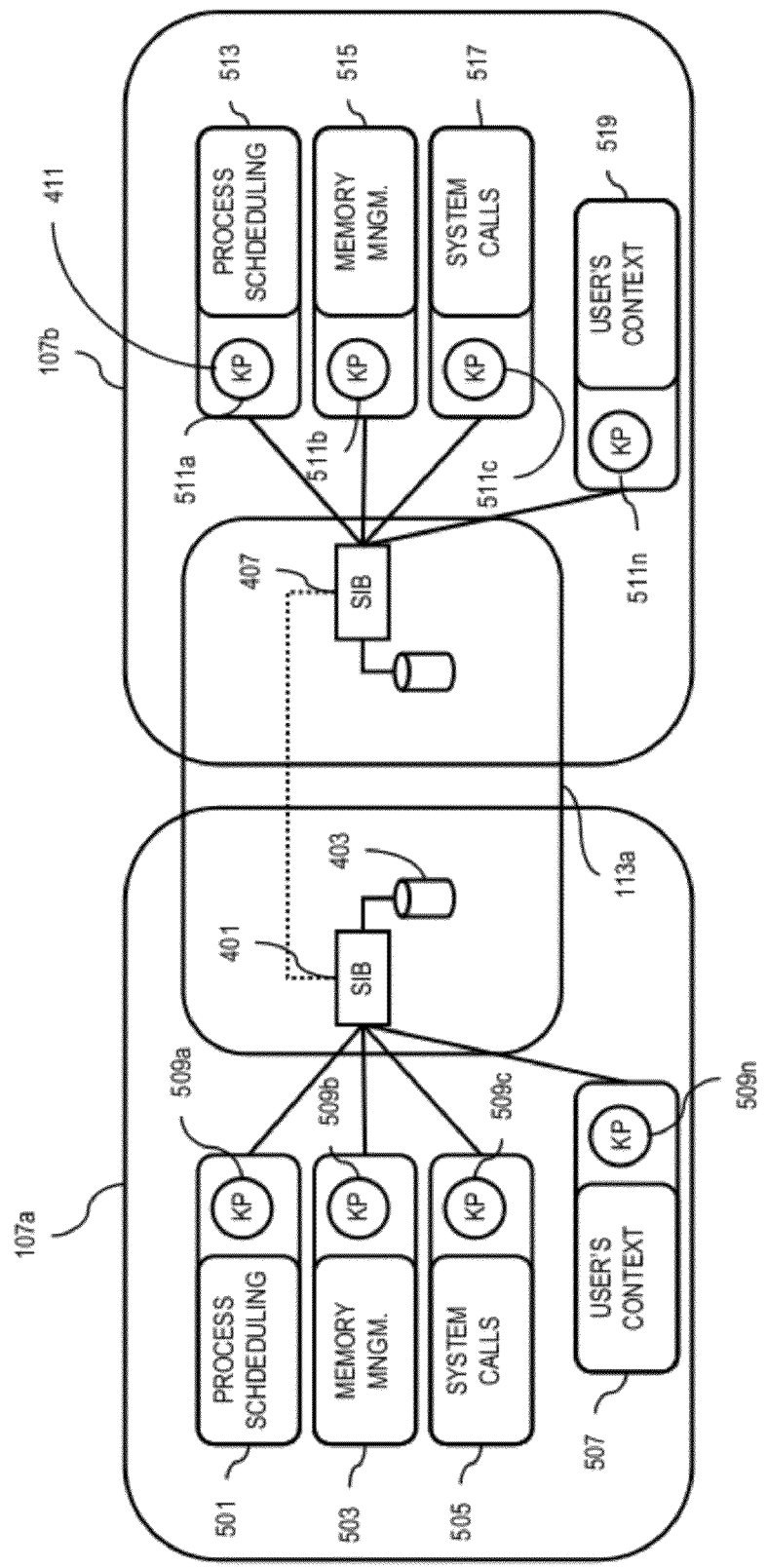
FIG. 5 is a diagram of process migration, according to one embodiment.

FIG. 5 is a diagram of process migration, according to one embodiment. Typically, during an information processing lifecycle, one or more execution contexts that may be represented in RDF form based on sub-graphs are stored by a SIB 401 of an information space 113a. The user context and execution context may result from execution of a program code of an application by a knowledge processor KP 509a-509n and stored in memory 403 of UE 107a which is utilized by SIB 401. If a KP 509a-509n of UE 107a detects that the UE 107b is attempting to communicate with UE 107a over a communications medium, UE 107a can share the user and execution contexts over a communications connection in the communications medium with UE 107b for continued or enhanced execution of an application by a KP 511a-511n in UE 107b. Following the completion of the process on UE 107b, the UE 107a may receive an alert from the SIB 401 indicating closing of the communication connection with (for example stationary wireless) UE 107b. In this case, UE 107a may receive updated user and execution contexts from the UE 107b over the communications connection so that the UE 107a can continue the execution of the application on a KP 509a-509n.

It is noted that a communications medium can be physical or logical/virtual, but all managed by the information management infrastructure 103 as virtual run-time environment high-context information (information processing context is seen as snapshot in the form of sub-graph). The sharing of the user and execution contexts and reflective process execution of the application on KP 511a-511n of UE 107b is managed by the information management infrastructure 103. The information management infrastructure 103 shares and provides reasoning about user and execution contexts between UE 107a and UE 107b with SIBs 401 and 407. For example UE 107a may be a mobile wireless device and UE 107b may be a stationary wireless device.

The information management infrastructure 103 enables aggregation of user and execution context information and scheduling of the run-time environment. This enables changes to be made to one or more user contexts 507 and 519 and execution contexts (not shown). Changes to user and execution contexts may include starting, executing, scheduling, dispersing, and aggregating of information within the environment of the information space set 113a processes or tasks wrapped through KPs 509a-509n and 511a-511n or other KPs functionalities such as process scheduling 501 and 513, memory management 503 and 515, system calls 505 and 517, etc.

KPs 509a-509n and 511a-511n and their corresponding information in the form of RDF sub-graph dispersion and aggregation may be performed by selective recycling apparatus of the information space set 113a and/or the distribution. Selective recycling may be driven by a recovery-conscious scheduler that may be part of the information space environment scheduler and supported by information provided by the computing environment processes/tasks scheduler 501 and 513. The user contexts 507 and 519 and the execution contexts (not shown) may be dynamically assigned and triggered by the information management infrastructure 103 and allocated according to a particular or operating system task management. It is noted that the terms KP and relevant information within SIB, represented as RDF sub-graph sets are abstract enough to be presented through other procedural aspects of the computing environment (e.g. a higher abstraction level).

In one embodiment, following the receipt of one or more user contexts 507 and 519 and additional execution contexts by UE 107b from UE 107a, and other relevant information over a communications medium, the UE 107b executes or shares the reflective state of the application by a KP 511a-511n. Upon completion of the process, the UE 107b may determine the information shared with SIB 407 through corresponding KP 511a-511n. This determination may result in closing a secure communication link with UE 107a. Prior to closing the communication connection, the UE 107b may share one or more user and execution contexts with UE 107a over the communications medium for continued execution of the application by KP 509a-509n in UE 107a. The sharing of the user and execution contexts and execution of the application on UE 107a is managed by the information management infrastructure 103. Such virtual run-time environment enables shared user and execution context sessions between UE 107a and UE 107b.

In another embodiment, prior to closing of the communication connection, the UE 107b may share an initial portion of the updated user and execution context with UE 107a over a initial communication connection and share the remaining portion of the updated user and execution contexts with UE 107a over the last communication connection for continued execution of the application on UE 107a. The adaptive computing platform described enables granular information processing context migration capability for a computing device to enhance the processing power of the devices within the information space environment.

Figure 6:
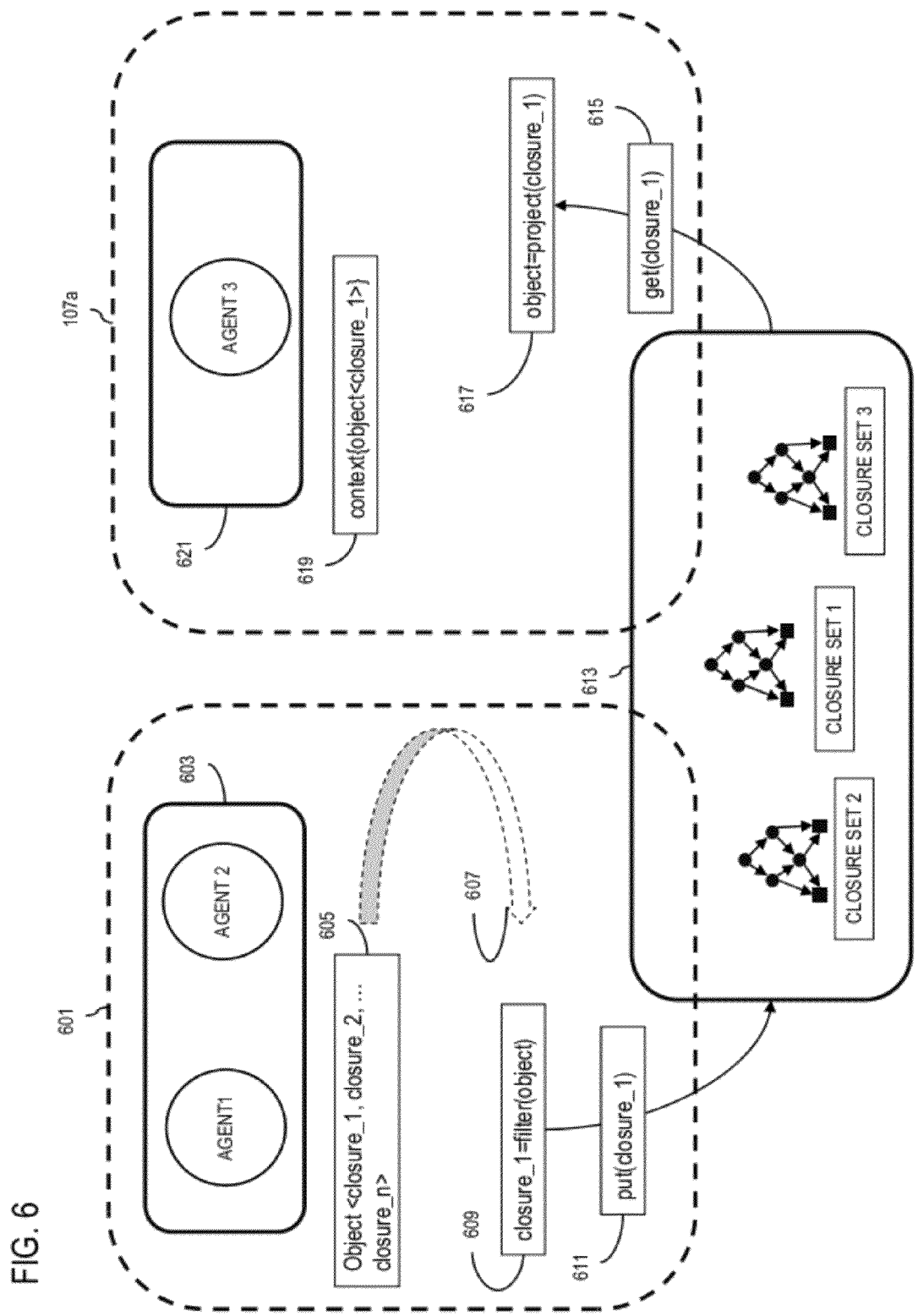
FIG. 6 is a diagram of process migration from a device to another device, according to one embodiment.

FIG. 6 is a diagram of process migration from a device to another device, according to one embodiment. In one embodiment, the backend device 601 may be a virtual run-time environment within the user's information spaces 113a-113n or on one UE 107 associated with the user. The backend device 601 may include a user context 603 for every user equipment 107a-107i connected to the backend device 601. The user context 603 may be a copy of the user context 621 for each device 107a which is being migrated among devices. Agent1 and agent2 are processors that calculate and handle computing closures within the user context 603. The number of agents may vary in different devices based on their design, functionality, processing power, etc. Block 605 represents an Object as a set of computing closures, closure_1, closure_2, . . . , and closure_n, where each closure is a component of a larger process, for example, related to a service provided to the user by the user equipment 107a. The closures may be generated by the closure definition module 205 of the information management infrastructure 103 and each closure is a standalone process that can be executed independently from the other closures. In the example of FIG. 6, the filtering process 607 extracts closure_1 from the closure set Object via filtering the set (shown in block 609). The filtering process may be performed by the closure definition module 205, the context serialization module 209 or by a separate component within the environment of the information management infrastructure 103. The extracted closure_1 is added to a computing closure store 613 using the exemplary Put command 611.

In this example, assuming that closure_1 is supposed to be executed on the user equipment 107a, the user equipment 107a extracts the closure_1 from the computing closure store 613 using, for instance, the Get command 615. In one embodiment, the extraction of the computing closures is managed by the process migration module 211.

In another embodiment, the decision of the equipment on which a computing closure is executed, may be made by a user by pushing or flicking graphical user interface elements (e.g., representative icons) associated with a process on one user equipment towards another user equipment (e.g. 107a). In addition or alternatively, the equipment executing a computing closure may be automatically assigned by the process migration module 211. The extracted closure_1 is projected into a closure with the user device context (process states) and the object 617 is produced. The projection process may be performed or managed by the context reconstruction module 213. The block 619 represents the reconstruction of the closure into the initial context by the context reconstruction module 213. The reconstructed context may then be executed in the run-time environment or context 621 of UE 107b by Agent3.

In another embodiment, the device 601 may be a user equipment and device 107a in FIG. 6 may be replaced by a backend device; or in other embodiments both blocks 601 and 8107a may be UEs. In these embodiments, the processes for closure definition and the context reconstruction are similar to the above example with the difference that closure_1 is extracted from a process on the device 601.

Figure 7:
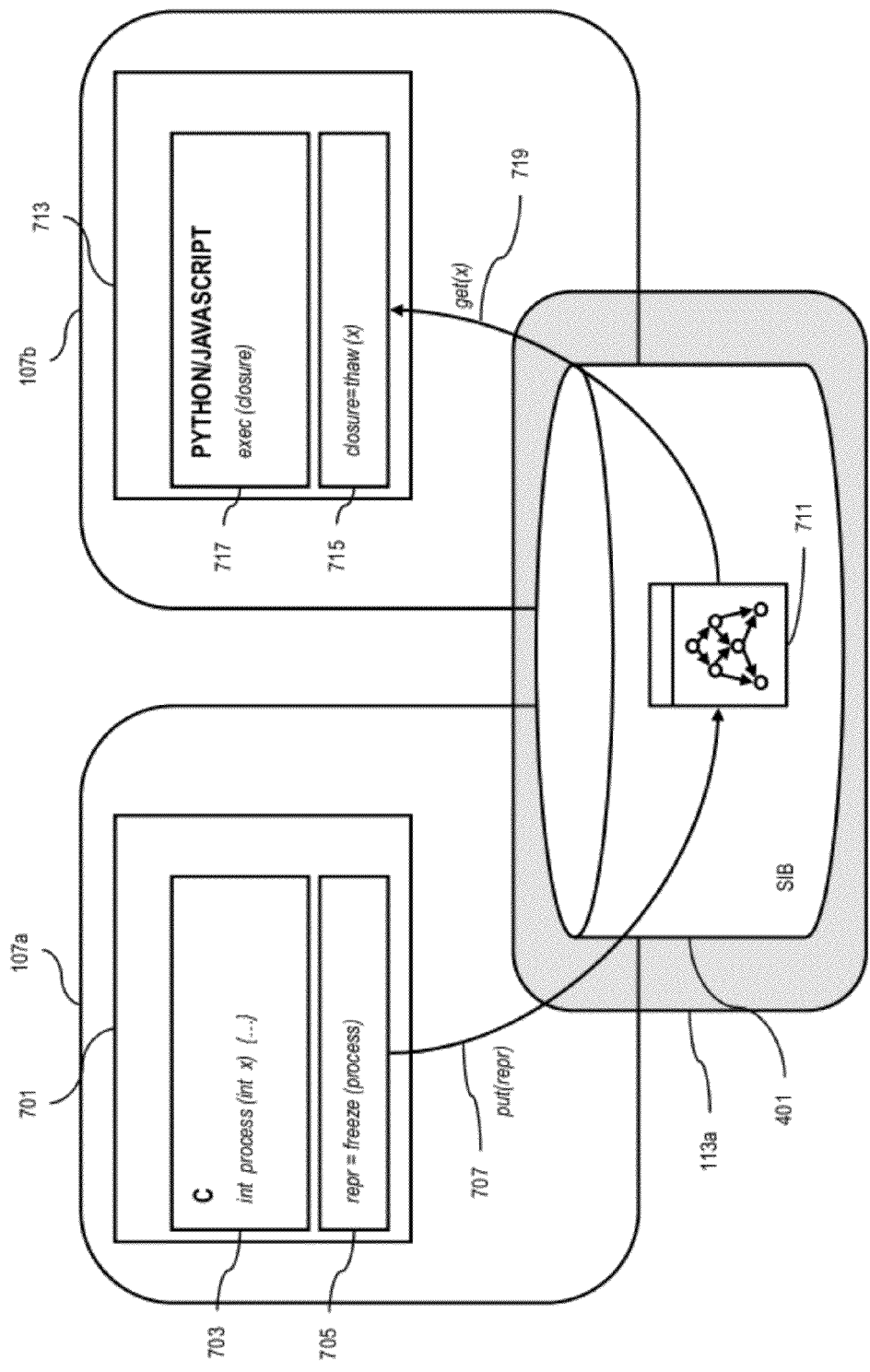
FIG. 7 is a diagram of granular process migration, according to one embodiment.
Figure 9:
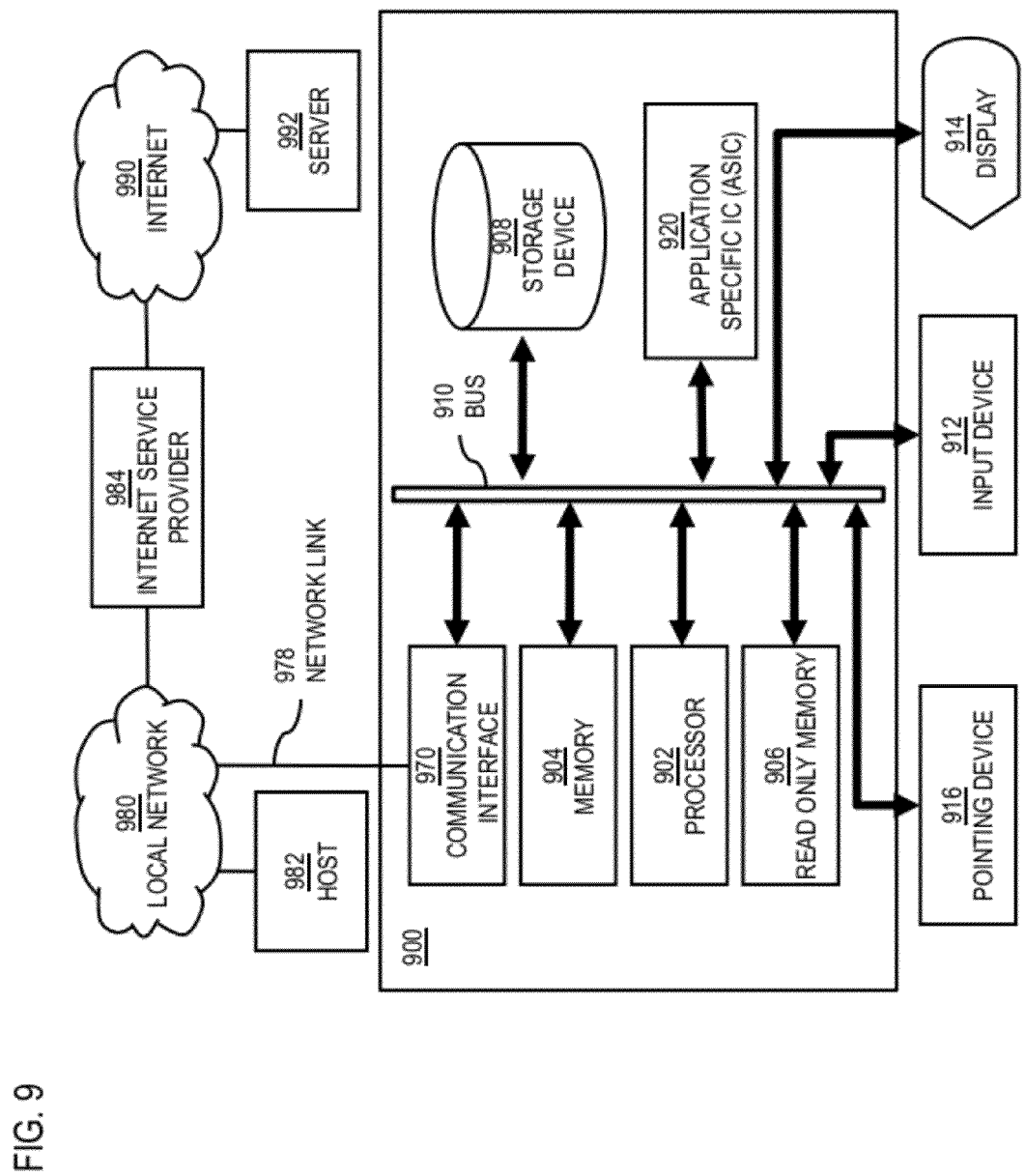
FIG. 9 is a diagram of hardware that can be used to implement an embodiment of the invention.

FIG. 7 is a diagram of granular process migration, according to one embodiment. As seen in FIG. 9, UE 107a contains a process 701 which includes codes 703 and 705 (for example written in C®). Assuming that a user of UE 107a has requested for a process (process) to be migrated to the UE 107b (by a certain gesture). The user gesture activates codes 703 and 705 where the code 703 activates the process identification module 201, the context determination module 203, and the closure definition module 205 of the information management infrastructure 103. As described in FIG. 2, the process identification module 201 identifies the process using the binding data, the context determination module 203 determines context x for the process, and the closure definition module 204 determines the computation closure that binds the process. Subsequently, the information is converted into RDF format by the context serialization module 209 of the information management infrastructure 103. The code 705 freezes the process which may halt the execution of process on UE 107a. Following the freeze, per arrow 707 the information regarding the process (including the identification, the contexts and the closure) is transmitted to an information space from set 113a and stored in an RDF form 711 by the SIB 401. Furthermore, the information identifying the targeted virtual run-time environment as selected by the user (for example, by gesturing towards a certain UE) may be also transmitted and stored by the SIB 401. Subsequently, the process migration module 211 of the information management infrastructure 103 may request the targeted agent (not shown) about the extent of information (e.g. the data required for the migrating process) the agent can access. In response, the agent may describe the extent of its information access. This may be larger than the set of information that may actually being accessed. Assuming that the selected agent has adequate access to the required information, the process migration module 211 may alert UE 107b about the migration request and send the process information from the information space set 113a via arrow 719 to the UE 107b. As seen in FIG. 7, the migration processing codes 715 and 717 of UE 107b may be written in a different language from the codes 703 and 705 in UE 107a (e.g. Python® or JavaScript®). Upon receiving the process migration information x at the UE 107b, execution of the code 715 on the received information may activate the context reconstruction module 213 from the information management infrastructure 103 to extract the process information including the context and the computation closure. The context reconstruction module 213 may also check the consistency of the received information with the receiving platform UE 107b. If the consistency requirement is met, the context reconstruction module 213 reconstructs the targeted virtual run-time environment, the user context and the execution context according to the RDF 711 in SIB 401. Execution of the code 717 on the UE 107b may trigger resumption of the execution of migrated process by the new platform UE 107b.

Figure 8A:
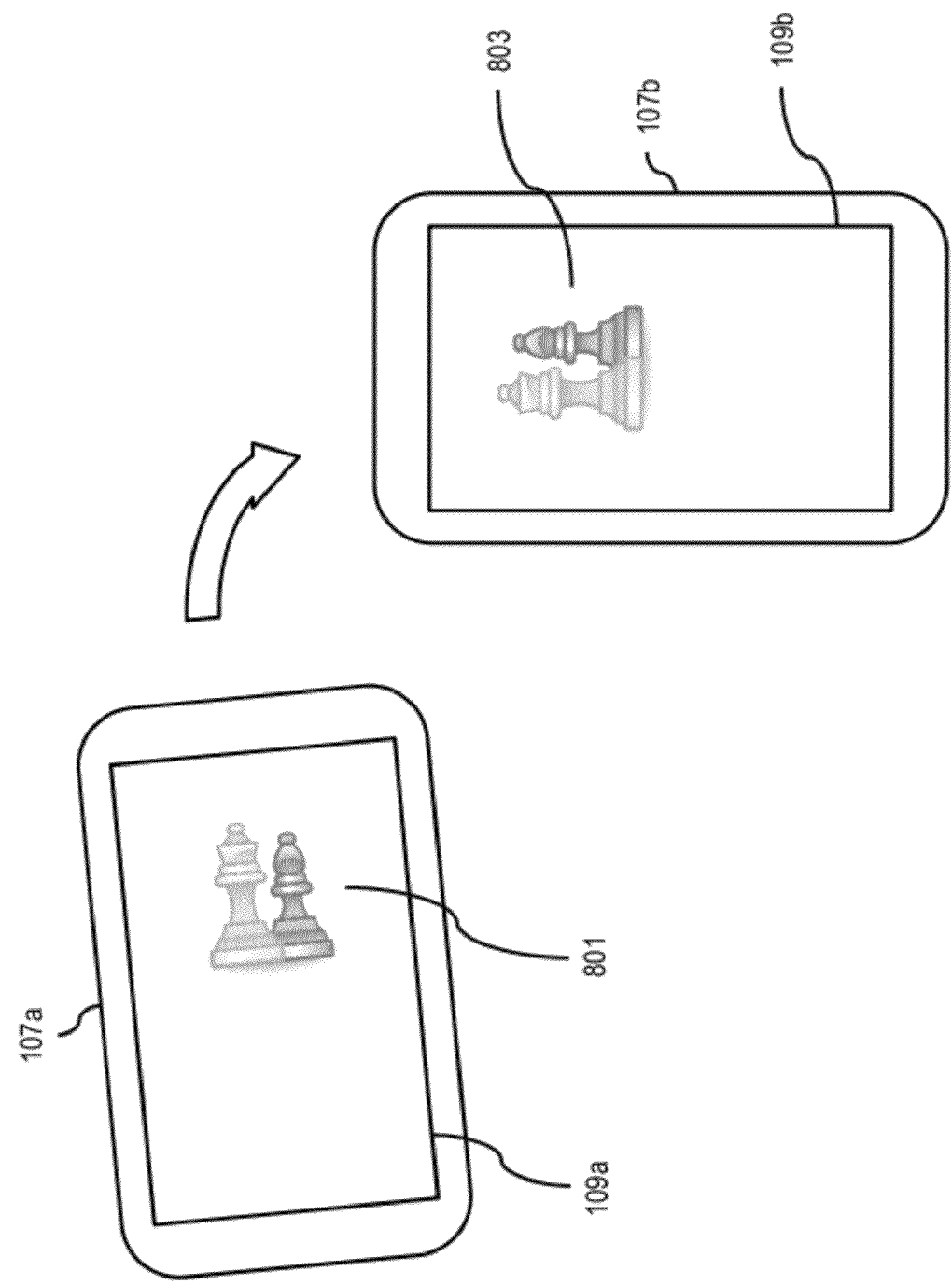
FIGS. 8A and 8B are diagrams of user interfaces used for granular process migration, according to various embodiments.
Figure 8B:
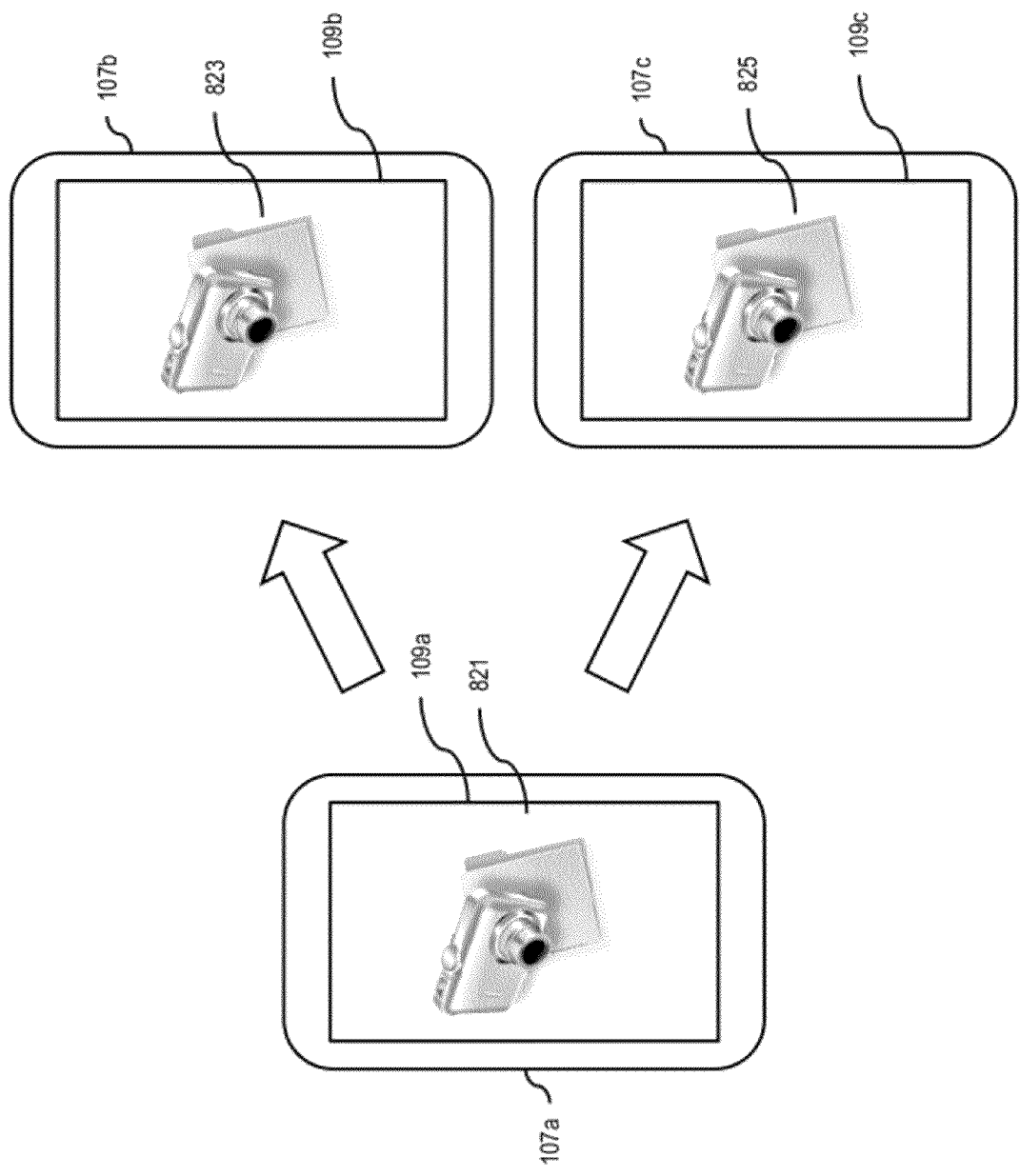

FIGS. 8A and 8B are diagrams of user interfaces used for granular process migration, according to various embodiments. More specifically, FIG. 8A is a diagram of a user interface for gesture-based process migration, according to one embodiment. As shown, FIG. 8A depicts a first UE 107a including a UI element 801 of a chess icon. In this example, the chess icon UI element 801 is bound to processes related to supporting a chess gaming application. To initiate a migration of the chess gaming processes of the UE 107a, the user may move the UE 107a in a "pouring" motion relative to a second UE 107b.

Once the process migration is initiated by the gesture, the information management infrastructure 103 can cause the UE 107a to display animation that simulates the movement of the chess icon UI element 801 from the UE 109a of the UE 107a to the UE 109b of the UE 107b. Moreover, the animation may extend from the UE 107a to the UE 107b, so that the chess icon UI element 801 transitions to appear as the chess icon UI element 803 in the UI 109b. In one embodiment, the coordination of the animation and related detection of the relative positions of the UEs 107a and 107b may be determined using short-range radio (e.g., Bluetooth®, WiFi®, radio-location methods, etc.).

As the UI element 801 is transferred into the UI element 803, the bound chess gaming processes are also transferred and reconstructed on the UE 107b. In one embodiment, the process migration deletes the process from the UE 107a on transfer. In another embodiment, the UE 107a retains the process after transfer so that identical processes appear in both the UEs 107a and 107b. The identical processes may operate independently (e.g., the chess game continues on different branches) or cooperatively (e.g., the chess game enables users of the UEs 107a and 107b to continue the game against each other from the different UEs 107a and 107b).

FIG. 8B depicts a diagram of user interfaces for process migration from one UE to multiple UEs, according to one embodiment. As shown, the UE 107a includes a UI 109a displaying a UI element 821 bound to processes for editing of images. In this example, the user can direct the UE 107a to initiate process migration of the photo editing processes to the UEs 107b and 107c. By way of example, the process migration can be initiated by flicking (e.g., via the user's finger on a touch screen of the UE 107a) the UI element 821 towards the direction of the UEs 107b and 107c.

In one embodiment, the migration may be initiated using a unicast process from the UE 107a to the UEs 107b and 107c individually. More specifically, the user may first flick (e.g., using a single finger) the UI element 821 towards the UE 107b to transfer the UI element 821 to the UI element 823 of the UI 109b. Then, in a separate motion, the user may flick the UE element 821 towards the UE 107c to transfer the UE element 821 to the UI element 825 of the UI 109c. On transfer of the UI element 821, the corresponding bound processes for photo-editing are also migrated to the UEs 107b and 107c.

In another embodiment, the user may make a multicast gesture (e.g., flicking with two fingers, each respectively towards the UE 107b and the UE 107c) to transfer the UI element 821 and corresponding bound processes. Accordingly, with the single multicast gesture, the user can initiate process migration to the two UEs 107b and 107c simultaneously.

In one embodiment, the simultaneous transfer of the processes may initiate transfer of different processes or of different data for use by the processes. For example, the photo-editing processes may be sub-divided accordingly to a specified level of granularity where process related to a first set of functions (e.g., color correction) are directed to the UE 107b and processes related to a second set of functions (e.g., cropping) are directed to the UE 107c. In addition, the UE 107a may retain another set of functions (e.g., uploading). In this way, different photo-editing functions may be distributed to different UEs 107a-107c based on, for instance, capabilities of the devices.

In another embodiment, the same processes may be migrated among the UEs 107a-107c so that the each of the UEs 107a-107c may apply the same processes on different sets of data or different portions of the same set of data.

The processes described herein for providing binding of user interface elements and granular reflective processing may be advantageously implemented via software, hardware, firmware or a combination of software and/or firmware and/or hardware. For example, the processes described herein, including for providing user interface navigation information associated with the availability of services, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

FIG. 9 illustrates a computer system 900 upon which an embodiment of the invention may be implemented. Although computer system 900 is depicted with respect to a particular device or equipment, it is contemplated that other devices or equipment (e.g., network elements, servers, etc.) within FIG. 9 can deploy the illustrated hardware and components of system 900. Computer system 900 is programmed (e.g., via computer program code or instructions) to bind user interface elements and granular reflective processing as described herein and includes a communication mechanism such as a bus 910 for passing information between other internal and external components of the computer system 900. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 900, or a portion thereof, constitutes a means for performing one or more steps of binding user interface elements and granular reflective processing.

A bus 910 includes one or more parallel conductors of information so that information is transferred quickly among devices coupled to the bus 910. One or more processors 902 for processing information are coupled with the bus 910.

A processor (or multiple processors) 902 performs a set of operations on information as specified by computer program code related to binding user interface elements and granular reflective processing. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 910 and placing information on the bus 910. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 902, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 900 also includes a memory 904 coupled to bus 910. The memory 904, such as a random access memory (RAM) or other dynamic storage device, stores information including processor instructions for binding user interface elements and granular reflective processing. Dynamic memory allows information stored therein to be changed by the computer system 900. RAM allows a unit of information stored at a location called a memory address to be stored and retrieved independently of information at neighboring addresses. The memory 904 is also used by the processor 902 to store temporary values during execution of processor instructions. The computer system 900 also includes a read only memory (ROM) 906 or other static storage device coupled to the bus 910 for storing static information, including instructions, that is not changed by the computer system 900. Some memory is composed of volatile storage that loses the information stored thereon when power is lost. Also coupled to bus 910 is a non-volatile (persistent) storage device 908, such as a magnetic disk, optical disk or flash card, for storing information, including instructions, that persists even when the computer system 900 is turned off or otherwise loses power.

Information, including instructions for binding user interface elements and granular reflective processing, is provided to the bus 910 for use by the processor from an external input device 912, such as a keyboard containing alphanumeric keys operated by a human user, or a sensor. A sensor detects conditions in its vicinity and transforms those detections into physical expression compatible with the measurable phenomenon used to represent information in computer system 900. Other external devices coupled to bus 910, used primarily for interacting with humans, include a display device 914, such as a cathode ray tube (CRT) or a liquid crystal display (LCD), or plasma screen or printer for presenting text or images, and a pointing device 916, such as a mouse or a trackball or cursor direction keys, or motion sensor, for controlling a position of a small cursor image presented on the display 914 and issuing commands associated with graphical elements presented on the display 914. In some embodiments, for example, in embodiments in which the computer system 900 performs all functions automatically without human input, one or more of external input device 912, display device 914 and pointing device 916 is omitted.

In the illustrated embodiment, special purpose hardware, such as an application specific integrated circuit (ASIC) 920, is coupled to bus 910. The special purpose hardware is configured to perform operations not performed by processor 902 quickly enough for special purposes. Examples of application specific ICs include graphics accelerator cards for generating images for display 914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 900 also includes one or more instances of a communications interface 970 coupled to bus 910. Communication interface 970 provides a one-way or two-way communication coupling to a variety of external devices that operate with their own processors, such as printers, scanners and external disks. In general the coupling is with a network link 978 that is connected to a local network 980 to which a variety of external devices with their own processors are connected. For example, communication interface 970 may be a parallel port or a serial port or a universal serial bus (USB) port on a personal computer. In some embodiments, communications interface 970 is an integrated services digital network (ISDN) card or a digital subscriber line (DSL) card or a telephone modem that provides an information communication connection to a corresponding type of telephone line. In some embodiments, a communication interface 970 is a cable modem that converts signals on bus 910 into signals for a communication connection over a coaxial cable or into optical signals for a communication connection over a fiber optic cable. As another example, communications interface 970 may be a local area network (LAN) card to provide a data communication connection to a compatible LAN, such as Ethernet. Wireless links may also be implemented. For wireless links, the communications interface 970 sends or receives or both sends and receives electrical, acoustic or electromagnetic signals, including infrared and optical signals, that carry information streams, such as digital data. For example, in wireless handheld devices, such as mobile telephones like cell phones, the communications interface 970 includes a radio band electromagnetic transmitter and receiver called a radio transceiver. In certain embodiments, the communications interface 970 enables connection to the communication network 105 for binding user interface elements and granular reflective processing for the UEs 101a-101n.

The term "computer-readable medium" as used herein refers to any medium that participates in providing information to processor 902, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 908. Volatile media include, for example, dynamic memory 904. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 920.

Network link 978 typically provides information communication using transmission media through one or more networks to other devices that use or process the information. For example, network link 978 may provide a connection through local network 980 to a host computer 982 or to equipment 984 operated by an Internet Service Provider (ISP). ISP equipment 984 in turn provides data communication services through the public, world-wide packet-switching communication network of networks now commonly referred to as the Internet 990.

A computer called a server host 992 connected to the Internet hosts a process that provides a service in response to information received over the Internet. For example, server host 992 hosts a process that provides information representing video data for presentation at display 914. It is contemplated that the components of system 900 can be deployed in various configurations within other computer systems, e.g., host 982 and server 992.

At least some embodiments of the invention are related to the use of computer system 900 for implementing some or all of the techniques described herein. According to one embodiment of the invention, those techniques are performed by computer system 900 in response to processor 902 executing one or more sequences of one or more processor instructions contained in memory 904. Such instructions, also called computer instructions, software and program code, may be read into memory 904 from another computer-readable medium such as storage device 908 or network link 978. Execution of the sequences of instructions contained in memory 904 causes processor 902 to perform one or more of the method steps described herein. In alternative embodiments, hardware, such as ASIC 920, may be used in place of or in combination with software to implement the invention. Thus, embodiments of the invention are not limited to any specific combination of hardware and software, unless otherwise explicitly stated herein.

The signals transmitted over network link 978 and other networks through communications interface 970, carry information to and from computer system 900. Computer system 900 can send and receive information, including program code, through the networks 980, 990 among others, through network link 978 and communications interface 970. In an example using the Internet 990, a server host 992 transmits program code for a particular application, requested by a message sent from computer 900, through Internet 990, ISP equipment 984, local network 980 and communications interface 970. The received code may be executed by processor 902 as it is received, or may be stored in memory 904 or in storage device 908 or other non-volatile storage for later execution, or both. In this manner, computer system 900 may obtain application program code in the form of signals on a carrier wave.

Various forms of computer readable media may be involved in carrying one or more sequence of instructions or data or both to processor 902 for execution. For example, instructions and data may initially be carried on a magnetic disk of a remote computer such as host 982. The remote computer loads the instructions and data into its dynamic memory and sends the instructions and data over a telephone line using a modem. A modem local to the computer system 900 receives the instructions and data on a telephone line and uses an infra-red transmitter to convert the instructions and data to a signal on an infra-red carrier wave serving as the network link 978. An infrared detector serving as communications interface 970 receives the instructions and data carried in the infrared signal and places information representing the instructions and data onto bus 910. Bus 910 carries the information to memory 904 from which processor 902 retrieves and executes the instructions using some of the data sent with the instructions. The instructions and data received in memory 904 may optionally be stored on storage device 908, either before or after execution by the processor 902.

FIG. 10 illustrates a chip set or chip 1000 upon which an embodiment of the invention may be implemented. Chip set 1000 is programmed to bind user interface elements and granular reflective processing as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1000 can be implemented in a single chip. It is further contemplated that in certain embodiments the chip set or chip 1000 can be implemented as a single "system on a chip." It is further contemplated that in certain embodiments a separate ASIC would not be used, for example, and that all relevant functions as disclosed herein would be performed by a processor or processors. Chip set or chip 1000, or a portion thereof, constitutes a means for performing one or more steps of providing user interface navigation information associated with the availability of services. Chip set or chip 1000, or a portion thereof, constitutes a means for performing one or more steps of binding user interface elements and granular reflective processing.

In one embodiment, the chip set or chip 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 1000 includes merely one or more processors and some software and/or firmware supporting and/or relating to and/or for the one or more processors.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to bind user interface elements and granular reflective processing. The memory 1005 also stores the data associated with or generated by the execution of the inventive steps.

Figure 11:
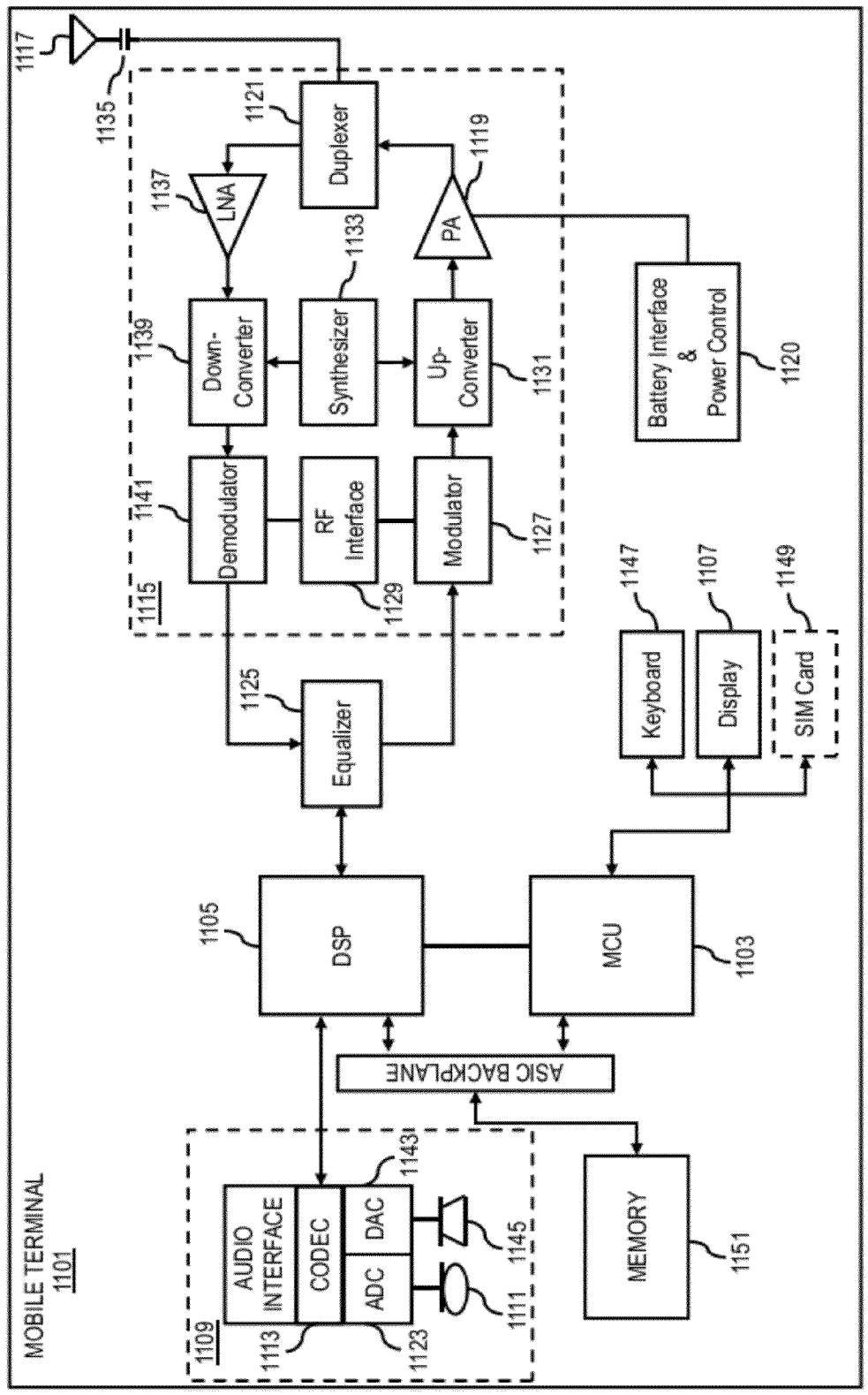
FIG. 11 is a diagram of a mobile terminal (e.g., handset) that can be used to implement an embodiment of the invention.

FIG. 11 is a diagram of exemplary components of a mobile terminal (e.g., handset) for communications, which is capable of operating in the system of FIG. 1, according to one embodiment. In some embodiments, mobile terminal 1101, or a portion thereof, constitutes a means for performing one or more steps of binding user interface elements and granular reflective processing. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory (ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1103, a Digital Signal Processor (DSP) 1105, and a receiver/transmitter unit including a microphone gain control unit and a speaker gain control unit. A main display unit 1107 provides a display to the user in support of various applications and mobile terminal functions that perform or support the steps of binding user interface elements and granular reflective processing. The display 1107 includes display circuitry configured to display at least a portion of a user interface of the mobile terminal (e.g., mobile telephone). Additionally, the display 1107 and display circuitry are configured to facilitate user control of at least some functions of the mobile terminal. An audio function circuitry 1109 includes a microphone 1111 and microphone amplifier that amplifies the speech signal output from the microphone 1111. The amplified speech signal output from the microphone 1111 is fed to a coder/decoder (CODEC) 1113.

A radio section 1115 amplifies power and converts frequency in order to communicate with a base station, which is included in a mobile communication system, via antenna 1117. The power amplifier (PA) 1119 and the transmitter/modulation circuitry are operationally responsive to the MCU 1103, with an output from the PA 1119 coupled to the duplexer 1121 or circulator or antenna switch, as known in the art. The PA 1119 also couples to a battery interface and power control unit 1120.

In use, a user of mobile terminal 1101 speaks into the microphone 1111 and his or her voice along with any detected background noise is converted into an analog voltage. The analog voltage is then converted into a digital signal through the Analog to Digital Converter (ADC) 1123. The control unit 1103 routes the digital signal into the DSP 1105 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 1125 for compensation of any frequency-dependent impairments that occur during transmission though the air such as phase and amplitude distortion. After equalizing the bit stream, the modulator 1127 combines the signal with a RF signal generated in the RF interface 1129. The modulator 1127 generates a sine wave by way of frequency or phase modulation. In order to prepare the signal for transmission, an up-converter 1131 combines the sine wave output from the modulator 1127 with another sine wave generated by a synthesizer 1133 to achieve the desired frequency of transmission. The signal is then sent through a PA 1119 to increase the signal to an appropriate power level. In practical systems, the PA 1119 acts as a variable gain amplifier whose gain is controlled by the DSP 1105 from information received from a network base station. The signal is then filtered within the duplexer 1121 and optionally sent to an antenna coupler 1135 to match impedances to provide maximum power transfer. Finally, the signal is transmitted via antenna 1117 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 1101 are received via antenna 1117 and immediately amplified by a low noise amplifier (LNA) 1137. A down-converter 1139 lowers the carrier frequency while the demodulator 1141 strips away the RF leaving only a digital bit stream. The signal then goes through the equalizer 1125 and is processed by the DSP 1105. A Digital to Analog Converter (DAC) 1143 converts the signal and the resulting output is transmitted to the user through the speaker 1145, all under control of a Main Control Unit (MCU) 1103 which can be implemented as a Central Processing Unit (CPU) (not shown).

The MCU 1103 receives various signals including input signals from the keyboard 1147. The keyboard 1147 and/or the MCU 1103 in combination with other user input components (e.g., the microphone 1111) comprise a user interface circuitry for managing user input. The MCU 1103 runs a user interface software to facilitate user control of at least some functions of the mobile terminal 1101 to bind user interface elements and granular reflective processing. The MCU 1103 also delivers a display command and a switch command to the display 1107 and to the speech output switching controller, respectively. Further, the MCU 1103 exchanges information with the DSP 1105 and can access an optionally incorporated SIM card 1149 and a memory 1151. In addition, the MCU 1103 executes various control functions required of the terminal. The DSP 1105 may, depending upon the implementation, perform any of a variety of conventional digital processing functions on the voice signals. Additionally, DSP 1105 determines the background noise level of the local environment from the signals detected by microphone 1111 and sets the gain of microphone 1111 to a level selected to compensate for the natural tendency of the user of the mobile terminal 1101.

The CODEC 1113 includes the ADC 1123 and DAC 1143. The memory 1151 stores various data including call incoming tone data and is capable of storing other data including music data received via, e.g., the global Internet. The software module could reside in RAM memory, flash memory, registers, or any other form of writable storage medium known in the art. The memory device 1151 may be, but not limited to, a single memory, CD, DVD, ROM, RAM, EEPROM, optical storage, or any other non-volatile storage medium capable of storing digital data.

An optionally incorporated SIM card 1149 carries, for instance, important information, such as the cellular phone number, the carrier supplying service, subscription details, and security information. The SIM card 1149 serves primarily to identify the mobile terminal 1101 on a radio network. The card 1149 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   determining to detect an event, from a first device, for specifying one or more user interface elements for transfer to a second device;
   identifying one or more processes bound to the user interface elements;
   determining at least one of a user context, an execution context within the user context, and one or more other execution contexts for the one or more processes, wherein the one or more other execution contexts are from at least one of the user context and one or more other user contexts;
   causing, at least in part, serialization of at least one of the user context, the execution context, and the one or more other execution contexts; and
   determining to transmit the serialization to the second device to initiate reconstruction of the at least one of the user context, the execution context, and the one or more other execution contexts, wherein
   the user context includes information, functions, and/or processes, the execution context within the user context includes memory states, processor states, and related information when executing the functions and/or processes for the user context, and the other execution contexts for the one or more processes includes memory states, processor states, and related information when executing the one or more processes.

2. A method of claim 1, wherein the input further specifies a granularity, and wherein the determining of the at least one of the user context, the execution context within the user context, and the one or more other execution contexts is based, at least in part, on the granularity.

3. A method of claim 1, further comprising:
   determining a run-time environment of the second device, wherein the identifying of the one or more processes, the determining of the at least one of the user context, the execution context within the user context, and the one or more other execution contexts, the serialization, or a combination thereof is based, at least in part, on the run-time environment.

4. A method of claim 1, further comprising:
   determining a resource load on at least one of the first device and the second device,
   wherein the identifying of the one or more processes, the determining of the at least one of the user context, the execution context within the user context, and the one or more other execution context, the serialization, or a combination thereof is based, at least in part, on the resource load.

5. A method of claim 1, wherein the input specifies, at least in part, a third device, the method further comprising:
   determining to transmit the serialization to the third device to initiate reconstruction of the at least one of the user context, the execution context within the execution context, and the one or more other execution contexts at the third device.

6. A method of claim 1, further comprising:
   causing, at least in part, detection that the first device is within proximity of the second device,
   wherein the input includes, at least in part, a gesture to indicate the transfer based, at least in part on the proximity.

7. A method of claim 6, wherein the gesture includes a flicking motion, a pouring motion, a grabbing motion, a pointing motion, a free-form motion to define at least a portion of the UI elements, or a combination thereof.

8. A method of claim 1, wherein the transmission is an indirect transmission via an information space, a third device, a cloud-computing component, a network infrastructure element, or a combination thereof.

9. A method of claim 1, wherein the serialization encodes the user context, the execution context, or a combination thereof according to a Resource Description Framework (RDF).

10. An apparatus comprising:
    at least one processor; and
    at least one memory including computer program code for one or more programs,
    the at least one memory and the computer program code configured to, with the at least one processor, cause the apparatus to perform at least the following,
    determine to detect an event, from a first device, for specifying one or more user interface elements for transfer to a second device;
    identify one or more processes bound to the user interface elements;
    determine at least one of a user context, an execution context within the user context, and one or more other execution contexts for the one or more processes, wherein the one or more other execution contexts are from at least one of the user context and one or more other user contexts;
    cause, at least in part, serialization of at least one of the user context, the execution context, and the one or more other execution contexts; and
    cause, at least in part, transmission of the serialization to the second device to initiate reconstruction of the at least one of the user context, the execution context, and the one or more other execution contexts, wherein
    the user context includes information, functions, and/or processes, the execution context within the user context includes memory states, processor states, and related information when executing the functions and/or processes for the user context, and the other execution contexts for the one or more processes includes memory states, processor states, and related information when executing the one or more processes.

11. An apparatus of claim 10, wherein the input further specifies a granularity, and wherein the determining of the at least one of the user context, the execution context within the user context, and the one or more other execution contexts is based, at least in part, on the granularity.

12. An apparatus of claim 10, wherein the apparatus is further caused to:
determine a run-time environment of the second device,
wherein the identifying of the one or more processes, the determining of the at least one of the user context, the execution context within the user context, and the one or more other execution contexts, the serialization, or a combination thereof is based, at least in part, on the run-time environment.

13. An apparatus of claim 10, wherein the apparatus is further caused to:
determining a resource load on at least one of the first device and the second device,
wherein the identifying of the one or more processes, the determining of the at least one of the user context, the execution context within the user context, and the one or more other execution contexts, the serialization, or a combination thereof is based, at least in part, on the resource load.

14. An apparatus of claim 10, wherein the input specifies, at least in part, a third device, and wherein the apparatus is further caused to:
determine to transmit the serialization to the third device to initiate reconstruction of the at least one of the user context, the execution context within the user context, and the one or more other execution contexts at the third device.

15. An apparatus of claim 10, further comprising:
causing, at least in part, detection that the first device is within proximity of the second device,
wherein the input includes, at least in part, a gesture to indicate the transfer based, at least in part on the proximity; and
wherein the gesture includes a flicking motion, a pouring motion, a grabbing motion, a pointing motion, a free-form motion to define at least a portion of the UI elements, or a combination thereof.

16. An apparatus of claim 10, wherein the transmission is an indirect transmission via an information space, a third device, a cloud-computing component, a network infrastructure element, or a combination thereof.

17. An apparatus of claim 10, wherein the serialization encodes the user context, the execution context, or a combination thereof according to a resource description framework.

18. A computer-readable storage medium carrying one or more sequences of one or more instructions which, when executed by one or more processors, cause an apparatus to at least perform the following steps:
determining to detect an event, from a first device, for specifying one or more user interface elements for transfer to a second device;
identifying one or more processes bound to the user interface elements;
determining at least one of a user context, an execution context within the user context, and one or more other execution contexts for the one or more processes, wherein the one or more other execution contexts are from at least one of the user context and one or more other user contexts;
causing, at least in part, serialization of at least one of the user context, the execution context, and the one or more other execution contexts; and
determining to transmit the serialization to the second device to initiate reconstruction of the at least one of the user context, the execution context, and the one or more other execution contexts, wherein
the user context includes information, functions, and/or processes, the execution context within the user context includes memory states, processor states, and related information when executing the functions and/or processes for the user context, and the other execution contexts for the one or more processes includes memory states, processor states, and related information when executing the one or more processes.

19. A computer-readable storage medium of claim 18, wherein the input further specifies a granularity, and wherein the determining of the user context, the execution context, or the combination thereof is based, at least in part, on the granularity.

20. A computer-readable storage medium of claim 18, wherein the apparatus is caused to further perform:
determining a run-time environment of the second device,
wherein the identifying of the one or more processes, the determining of the user context, the execution context, or the combination thereof, the serialization or a combination thereof is based, at least in part, on the run-time environment.

* * * * *